United States Patent
Huang et al.

(10) Patent No.: US 11,357,033 B2
(45) Date of Patent: *Jun. 7, 2022

(54) OPPORTUNISTIC UPLINK TRANSMISSION

(71) Applicant: QUALCOMM Incorporated, San Diego, CA (US)

(72) Inventors: Yi Huang, San Diego, CA (US); Hao Xu, Beijing (CN); Wanshi Chen, San Diego, CA (US); Renqiu Wang, San Diego, CA (US); Joseph Binamira Soriaga, San Diego, CA (US); Peter Gaal, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/835,067

(22) Filed: Mar. 30, 2020

(65) Prior Publication Data

US 2020/0229224 A1    Jul. 16, 2020

Related U.S. Application Data

(63) Continuation of application No. 15/933,239, filed on Mar. 22, 2018, now Pat. No. 10,638,501.
(Continued)

(51) Int. Cl.
*H04W 72/12*    (2009.01)
*H04W 76/27*    (2018.01)
(Continued)

(52) U.S. Cl.
CPC ... *H04W 72/1284* (2013.01); *H04W 28/0263* (2013.01); *H04W 52/365* (2013.01);
(Continued)

(58) Field of Classification Search
CPC ......... H04W 72/1284; H04W 72/1263; H04W 76/27; H04W 72/14; H04W 28/0278;
(Continued)

(56) References Cited

U.S. PATENT DOCUMENTS 10,375,734 B2 *   8/2019   Suzuki .................... H04J 13/22
2009/0290570 A1 * 11/2009   Kishiyama ............... H04B 1/59
                                                              370/344
(Continued)

FOREIGN PATENT DOCUMENTS

WO    2015099585 A1    7/2015

OTHER PUBLICATIONS

Ericsson, et al., "Latency Improvement Comparison", 3GPP TSG-RAN WG2 #67, 3GPP Draft; R2-094825 (Latency Improvements Comparison), 3rd Generation Partnership Project (3GPP), Mobile Competence Centre; 650, Route Des Lucioles; F-06921 Sophia-Antipolis Cedex; France, No. Shenzhen, China; Aug. 18, 2009, Aug. 18, 2009 (Aug. 18, 2009), pp. 1-4, XP050352833, [retrieved on Aug. 18, 2009].

(Continued)

*Primary Examiner* — Jamal Javaid
*Assistant Examiner* — Thad N Defauw
(74) *Attorney, Agent, or Firm* — Loza & Loza, LLP

(57) ABSTRACT

Aspects of the present disclosure provide for opportunistic uplink transmissions within a slot. In some examples, after scheduling all regular uplink transmissions within a current slot, a base station (e.g., gNB) may identify a set of unused uplink resources within the current slot and generate and transmit unused resource information identifying the set of unused resources to the user equipment (UE) within the cell served by the base station. If a particular UE is configured to operate in an opportunistic mode, the UE may utilize the unused resource information to generate and transmit an (Continued)

opportunistic uplink transmission within the set of unused uplink resources.

25 Claims, 20 Drawing Sheets

Related U.S. Application Data

(60) Provisional application No. 62/476,415, filed on Mar. 24, 2017.

(51) Int. Cl.
    *H04W 72/14*     (2009.01)
    *H04W 52/36*     (2009.01)
    *H04W 28/02*     (2009.01)
    *H04W 74/08*     (2009.01)

(52) U.S. Cl.
    CPC ... *H04W 72/1263* (2013.01); *H04W 72/1289* (2013.01); *H04W 72/14* (2013.01); *H04W 76/27* (2018.02); *H04W 28/0278* (2013.01); *H04W 72/1268* (2013.01); *H04W 74/0833* (2013.01)

(58) Field of Classification Search
    CPC ........... H04W 74/0833; H04W 52/365; H04W 72/1289; H04W 28/0263
    See application file for complete search history.

(56) References Cited

U.S. PATENT DOCUMENTS

| | | | |
|---|---|---|---|
| 2010/0190447 A1* | 7/2010 | Agrawal | H04W 72/082 455/63.1 |
| 2010/0296454 A1* | 11/2010 | Park | H04L 1/1812 370/328 |
| 2011/0243060 A1 | 10/2011 | Mildh et al. | |
| 2012/0093120 A1* | 4/2012 | Ko | H04B 7/0671 370/329 |
| 2012/0099527 A1* | 4/2012 | Ishii | H04W 72/048 370/328 |
| 2013/0003650 A1* | 1/2013 | Han | H04B 7/155 370/315 |
| 2013/0040679 A1* | 2/2013 | Kashiwase | H04W 72/04 455/509 |
| 2013/0083742 A1* | 4/2013 | Baldemair | H04L 1/003 370/329 |
| 2014/0010169 A1* | 1/2014 | Novak | H04W 72/085 370/329 |
| 2016/0353453 A1* | 12/2016 | Au | H04W 74/006 |
| 2017/0251518 A1* | 8/2017 | Agiwal | H04W 24/08 |
| 2018/0279348 A1 | 9/2018 | Huang et al. | |

OTHER PUBLICATIONS

International Search Report and Written Opinion—PCT/US2018/024161—ISA/EPO—dated Jun. 20, 2018.

Orange: "On Traffic Load Reporting in LTE", 3GPP Draft, TSG-RAN WG3 #51 bis, R3-060426, 3rd Generation Partnership Project (3GPP), Mobile Competence Centre, 650, Route Des Lucioles, F-06921, Sophia-Antipolis Cedex, France, vol. RAN WG3, No. Sophia Antipolis, France; Apr. 3-5, 2006, Mar. 30, 2006, Mar. 30, 2006 (Mar. 30, 2006), XP050159354, 8 pages, [retrieved on Mar. 30, 2006].

* cited by examiner

DL-Centric Slot

UL-Centric Slot

OPPORTUNISTIC UPLINK TRANSMISSION

PRIORITY CLAIM

The present application for patent is a Continuation of Non-Provisional application Ser. No. 15/933,239 filed in the U.S. Patent and Trademark Office on Mar. 22, 2018, the entire content of which is incorporated herein by reference as if fully set forth below in its entirety and for all applicable purposes. Non-Provisional application Ser. No. 15/933,239 claims priority to and the benefit of Provisional Patent Application No. 62/476,415 filed in the U.S. Patent and Trademark Office on Mar. 24, 2017, the entire content of which is incorporated herein by reference as if fully set forth below in its entirety and for all applicable purposes.

TECHNICAL FIELD

The technology discussed below relates generally to wireless communication systems, and more particularly, to facilitating transmissions on the uplink in a wireless network.

INTRODUCTION

Wireless transmissions between a base station and one or more user equipment (UE) within a cell are generally scheduled in each subframe or slot. For example, the base station may assign resources (e.g., time-frequency resources) for downlink transmissions to one or more UEs and grant the use of resources for uplink transmissions from one or more UEs. The downlink assignments and uplink grants may be provided to the UEs via a physical downlink control channel (PDCCH).

A common form of scheduling utilized in wireless networks is dynamic scheduling, where resources are scheduled when user data traffic is available to be transmitted. For example, in the downlink (e.g., from the base station to the UE), resources may be assigned when the base station has user data traffic to send to the UE. In the uplink (e.g., from the UE to the base station), the UE may transmit a scheduling request to the base station when user data traffic arrives in the UE's uplink buffer.

While dynamic scheduling works well for bursty, infrequent, or bandwidth consuming uplink transmissions, dynamic scheduling is less ideal for low-latency uplink transmissions due to the delay and overhead requirements involved with dynamic scheduling. Therefore, other mechanisms for transmitting uplink user data traffic continue to be researched and developed.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to enabling opportunistic uplink transmissions within a slot. In some examples, after scheduling all regular uplink transmissions within a current slot, a scheduling entity (e.g., base station) may identify a set of unused uplink resources within the current slot and generate and transmit unused resource information identifying the set of unused resources to the scheduled entities (e.g., user equipment) within the cell served by the scheduling entity. If a particular scheduled entity is configured to operate in an opportunistic mode, the scheduled entity may utilize the unused resource information to generate and transmit an opportunistic uplink transmission within the set of unused uplink resources. The opportunistic uplink transmission may include, for example, one or more of a grant-free user data traffic transmission for urgent transmissions, a scheduling request transmission or a random access request transmission.

In one aspect of the disclosure, a method of wireless communication in a wireless communication network for a scheduling entity to communicate with a set of one or more scheduled entities is provided. The method includes identifying a set of unused uplink resources unassigned to any of the set of one or more scheduled entities within a slot, transmitting unused resource information identifying the set of unused uplink resources to the set of one or more scheduled entities, and receiving an opportunistic uplink transmission from a scheduled entity of the set of one or more scheduled entities within the set of unused uplink resources of the slot.

Another aspect of the disclosure provides a scheduling entity within a wireless communication network. The scheduling entity includes a processor, a memory communicatively coupled to the processor, and a transceiver communicatively coupled to the processor. The processor is configured to identify a set of unused uplink resources unassigned to any of a set of one or more scheduled entities within a slot, transmit unused resource information identifying the set of unused uplink resources to the set of one or more scheduled entities via the transceiver, and receive an opportunistic uplink transmission via the transceiver from a scheduled entity of the set of one or more scheduled entities within the set of unused uplink resources of the slot.

Another aspect of the disclosure provides a method of wireless communication in a wireless communication network for a scheduled entity to communicate with a scheduling entity. The method includes receiving unused resource information identifying a set of unused uplink resources within a slot. When the scheduled entity is operating in an opportunistic mode, the method further includes determining whether the set of unused uplink resources are to be utilized for an opportunistic uplink transmission, and if the set of unused uplink resources are to be utilized for an opportunistic uplink transmission, transmitting the opportunistic uplink transmission within the set of unused uplink resources of the slot.

Another aspect of the disclosure provides a scheduled entity within a wireless communication network. The scheduled entity includes a processor, a memory communicatively coupled to the process, and a transceiver communicatively coupled to the processor. The processor is configured to receive unused resource information identifying a set of unused uplink resources within a slot via the transceiver. When the scheduled entity is operating in an opportunistic mode, the processor is further configured to determine whether the set of unused uplink resources are to be utilized for an opportunistic uplink transmission, and if the set of unused uplink resources are to be utilized for an opportunistic uplink transmission, transmit the opportunistic uplink transmission within the set of unused uplink resources of the slot via the transceiver.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
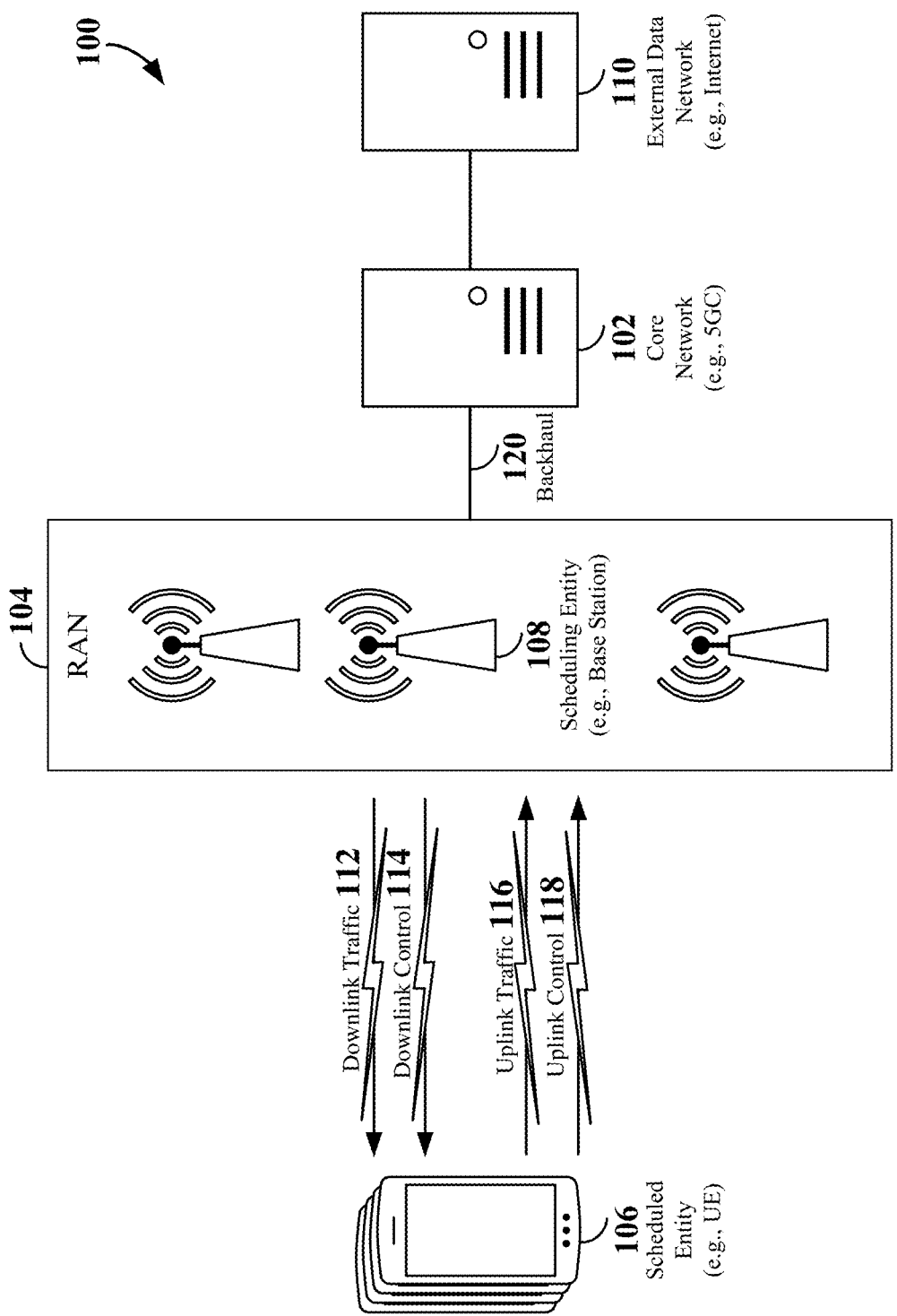
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
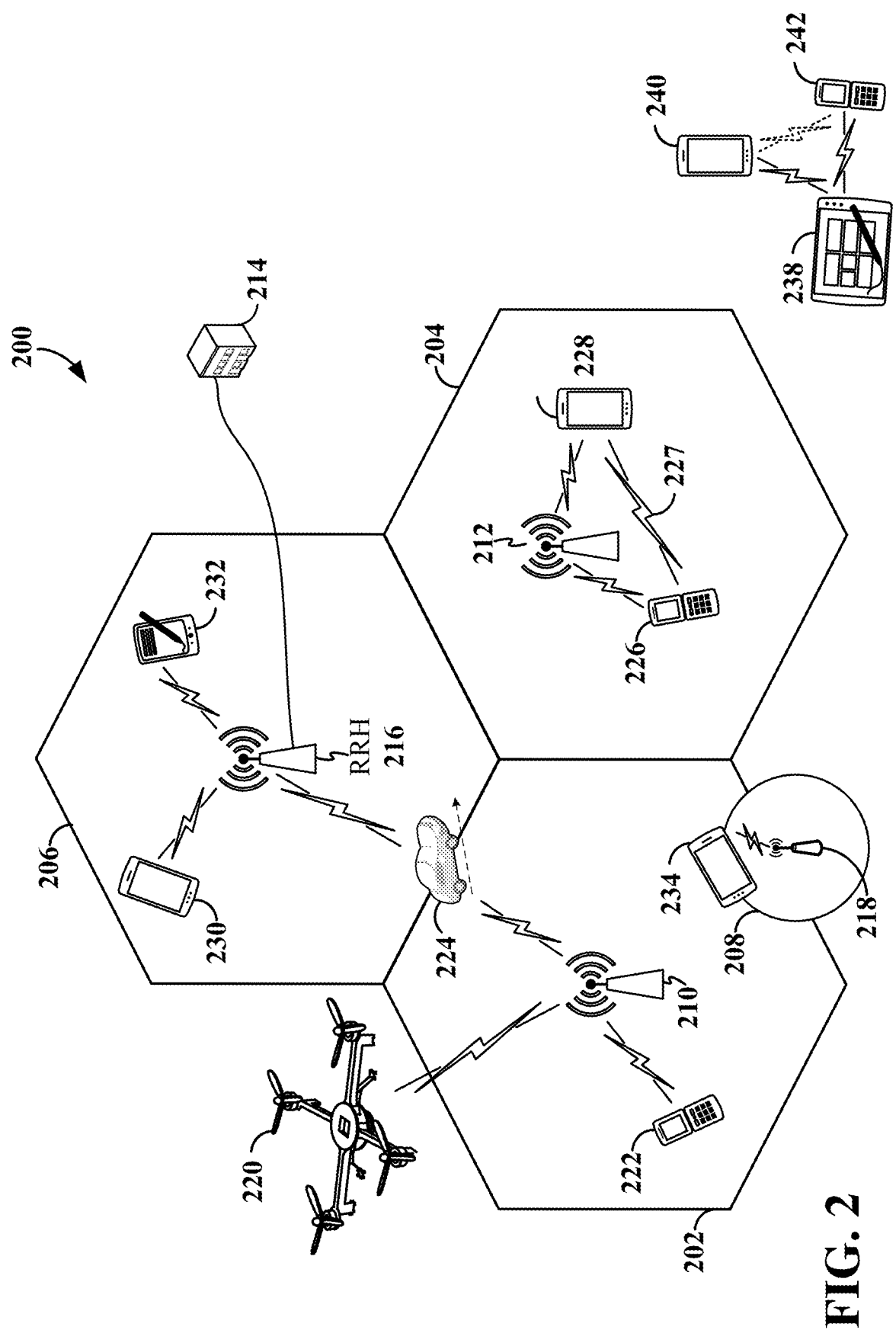
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
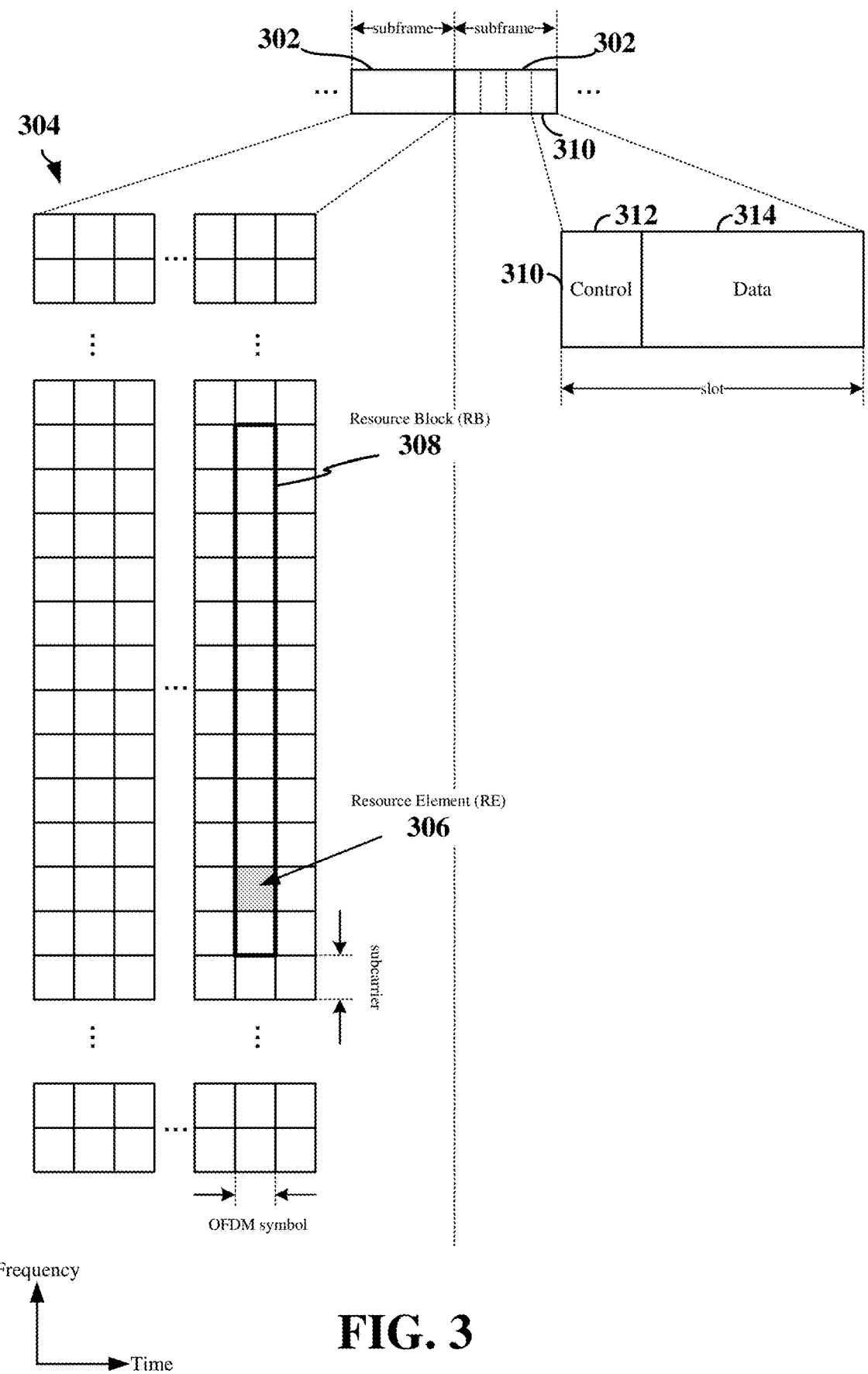
FIG. 3 is a diagram illustrating an example of a frame structure for use in a radio access network.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG) or sub-band. A set of sub-bands may span the entire bandwidth. Scheduling of UEs (scheduled entities) for downlink or uplink transmissions typically involves scheduling one or more resource elements 306 within one or more sub-bands. Thus, a UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks or resource block groups (e.g., groups of sub-carriers and OFDM symbols) may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
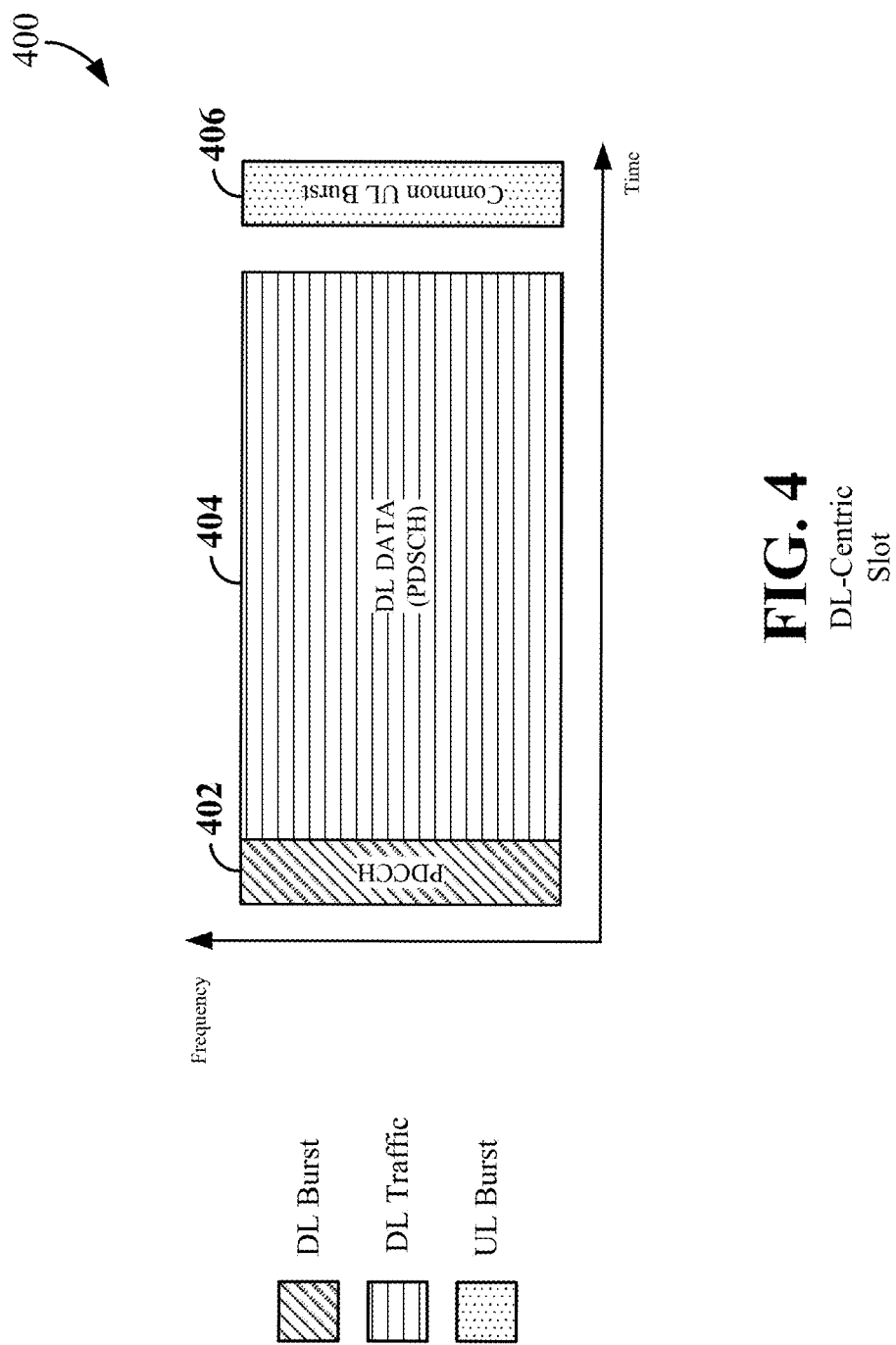
FIG. 4 is a diagram illustrating an example of a downlink (DL)-centric slot.
Figure 5:
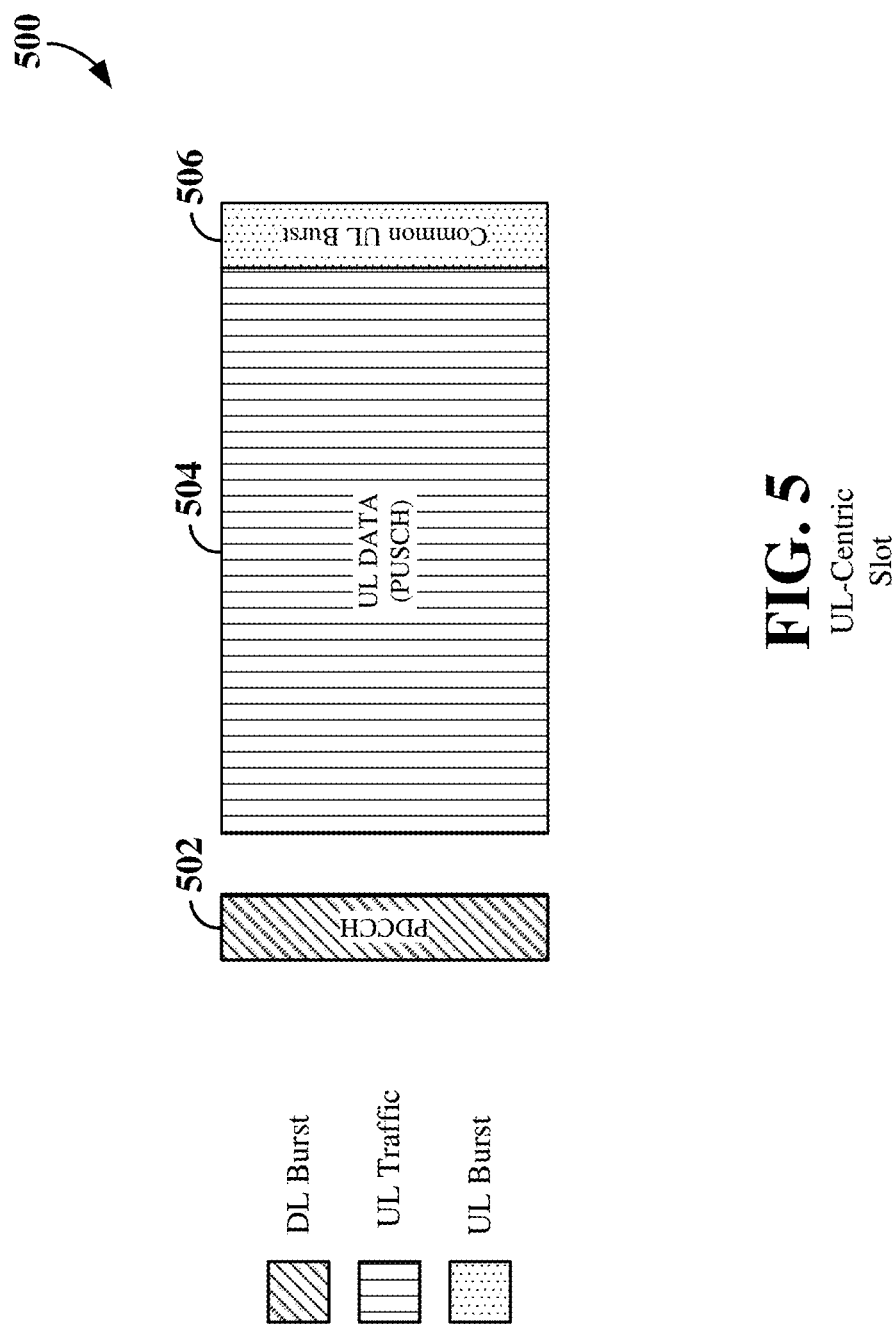
FIG. 5 is a diagram illustrating an example of an uplink (UL)-centric slot.

According to an aspect of the disclosure, one or more slots may be structured as self-contained slots. For example, FIGS. 4 and 5 illustrate two example structures of self-contained slots 400 and 500. The self-contained slots 400 and/or 500 may be used, in some examples, in place of the slot 310 described above and illustrated in FIG. 3.

FIG. 4 is a diagram illustrating an example of a downlink (DL)-centric slot 400 according to some aspects of the disclosure. The nomenclature DL-centric generally refers to a structure wherein more resources are allocated for transmissions in the DL direction (e.g., transmissions from the scheduling entity 108 to the scheduled entity 106). In the example shown in FIG. 4, time is illustrated along a horizontal axis, while frequency is illustrated along a vertical axis. The time-frequency resources of the DL-centric slot 400 may be divided into a DL burst 402, a DL traffic region 404 and an UL burst 406.

The DL burst 402 may exist in the initial or beginning portion of the DL-centric slot. The DL burst 402 may include any suitable DL information in one or more channels. In some examples, the DL burst 402 may include various scheduling information and/or control information corresponding to various portions of the DL-centric slot. In some configurations, the DL burst 402 may be a physical DL control channel (PDCCH), as indicated in FIG. 4. The DL-centric slot may also include a DL traffic region 404. The DL traffic region 404 may sometimes be referred to as the payload of the DL-centric slot. The DL traffic region 404 may include the communication resources utilized to communicate DL user data traffic from the scheduling entity 108 (e.g., eNB) to the scheduled entity 106 (e.g., UE). In some configurations, the DL traffic region 404 may include a physical DL shared channel (PDSCH).

The UL burst 406 may include any suitable UL information in one or more channels. In some examples, the UL burst 406 may include feedback information corresponding to various other portions of the DL-centric slot. For example, the UL burst 406 may include feedback information corresponding to the control portion 402 and/or DL traffic region 404. Non-limiting examples of feedback information may include an ACK signal, a NACK signal, a HARQ indicator, and/or various other suitable types of information. The UL burst 406 may include additional or alternative information, such as information pertaining to random access channel (RACH) procedures, scheduling requests (SRs) (e.g., within a PUCCH), and various other suitable types of information.

Here, a slot such as the DL-centric slot 400 may be referred to as a self-contained slot when all of the data carried in the DL traffic region 404 is scheduled in the control region 402 of the same slot; and further, when all of the data carried in the DL traffic region 404 is acknowledged (or at least has an opportunity to be acknowledged) in the UL burst 406 of the same slot. In this way, each self-contained slot may be considered a self-contained entity, not necessarily requiring any other slot to complete a scheduling-transmission-acknowledgment cycle for any given packet.

As illustrated in FIG. 4, the end of the DL traffic region 404 may be separated in time from the beginning of the UL burst 406. This time separation may sometimes be referred to as a gap, a guard period, a guard interval, and/or various other suitable terms. This separation provides time for the switch-over from DL communication (e.g., reception operation by the scheduled entity 106 (e.g., UE)) to UL communication (e.g., transmission by the scheduled entity 106 (e.g., UE)). One of ordinary skill in the art will understand that the foregoing is merely one example of a DL-centric slot and alternative structures having similar features may exist without necessarily deviating from the aspects described herein.

FIG. 5 is a diagram showing an example of an uplink (UL)-centric slot 500 according to some aspects of the disclosure. The nomenclature UL-centric generally refers to a structure wherein more resources are allocated for transmissions in the UL direction (e.g., transmissions from the scheduled entity 106 to the scheduling entity 108). In the example shown in FIG. 5, time is illustrated along a horizontal axis, while frequency is illustrated along a vertical axis. The time-frequency resources of the UL-centric slot 500 may be divided into a DL burst 502, an UL traffic region 504 and an UL burst 506.

The DL burst 502 may exist in the initial or beginning portion of the UL-centric slot. The DL burst 502 in FIG. 5 may be similar to the DL burst 402 described above with reference to FIG. 4. The UL-centric slot may also include an UL traffic region 504. The UL traffic region 504 may sometimes be referred to as the payload of the UL-centric slot. The UL traffic region 504 may include the communication resources utilized to communicate UL user data traffic from the scheduled entity 106 (e.g., UE) to the scheduling entity 108 (e.g., eNB). In some configurations, the UL traffic region 504 may be a physical UL shared channel (PUSCH). As illustrated in FIG. 5, the end of the DL burst 502 may be separated in time from the beginning of the UL traffic region 504. This time, separation may sometimes be referred to as a gap, guard period, guard interval, and/or various other suitable terms. This separation provides time for the switchover from DL communication (e.g., reception operation by the scheduling entity 106 (e.g., UE)) to UL communication (e.g., transmission by the scheduling entity 108 (e.g., UE)).

The UL burst 506 in FIG. 5 may be similar to the UL burst 406 described above with reference to FIG. 4. The UL burst 506 may additionally or alternatively include information pertaining to channel quality indicator (CQI), sounding reference signals (SRSs), and various other suitable types of information. One of ordinary skill in the art will understand that the foregoing is merely one example of an UL-centric slot, and alternative structures having similar features may exist without necessarily deviating from the aspects described herein.

Scheduling of uplink resources (e.g., resource elements/resource blocks) for use by scheduled entities to transmit control and/or traffic information may be performed in various ways. One such example is semi-persistent scheduling (SPS), where the scheduled entity is pre-configured by the scheduling entity with a periodicity of uplink grants. Once configured, the scheduled entity may transmit uplink transmissions at regular intervals according to the periodicity. Typically, during SPS, the resource assignments and modulation and coding scheme remain fixed for each transmission.

Figure 6:
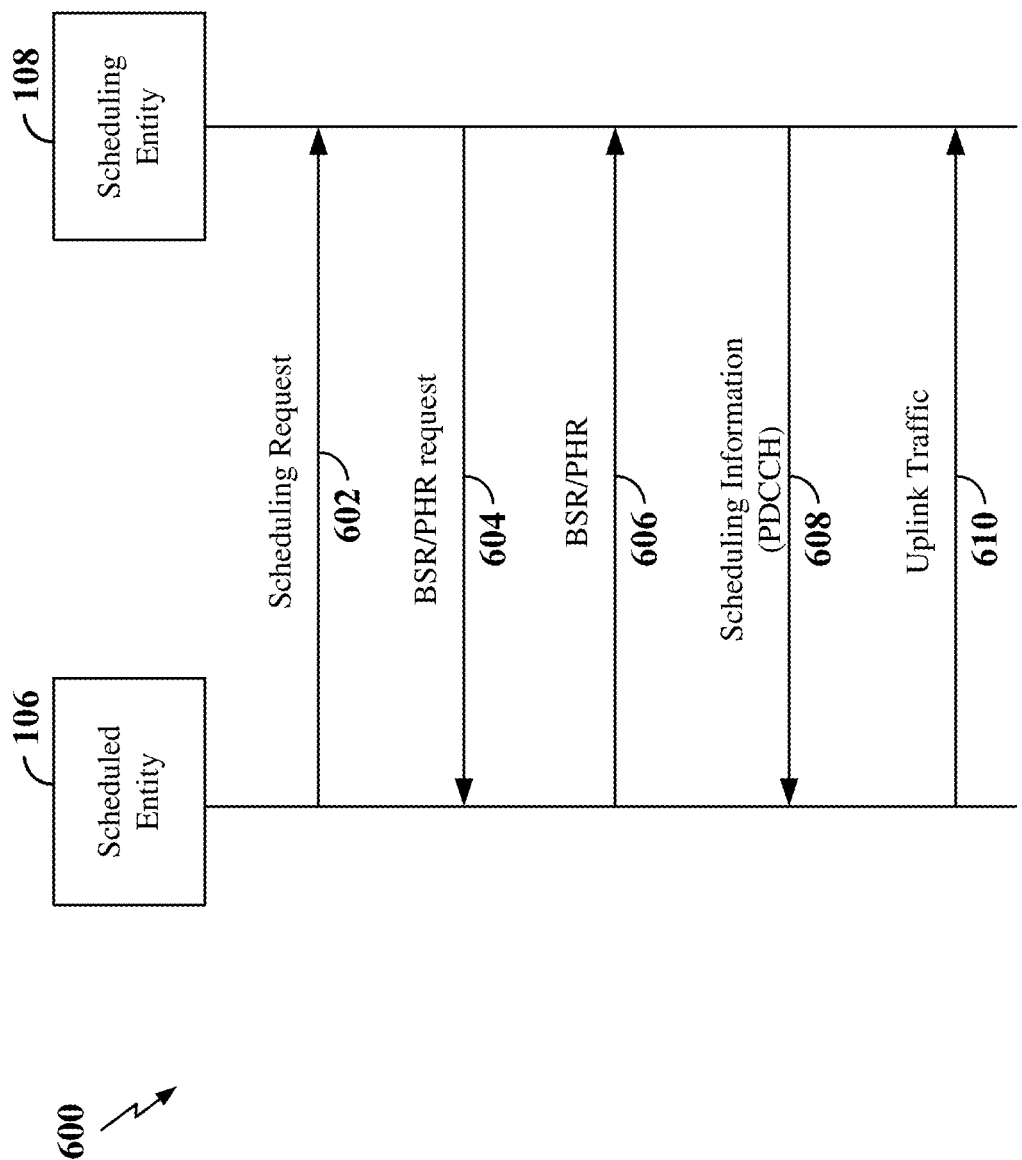
FIG. 6 is a signaling diagram illustrating exemplary signaling for dynamic scheduling.

Another type of scheduling is referred to herein as dynamic scheduling, where resources are scheduled when data is available to be transmitted. FIG. 6 is a signaling diagram 600 illustrating exemplary signaling for dynamic or regular scheduling according to some aspects of the present disclosure. When data arrives in an uplink buffer of a scheduled entity 106, at 602, the scheduled entity 106 may transmit a scheduling request to the scheduling entity 108 to request an uplink grant of time-frequency resources (e.g., resource elements/resource blocks) for the scheduled entity 106 to transmit the data to the scheduled entity 106. The scheduling request may be transmitted, for example, via the PUCCH within an UL burst of a DL-centric slot or an UL-centric slot.

In response to the scheduling request, at 604, the scheduling entity 108 may transmit a buffer status report (BSR) request and power headroom report (PHR) request. The BSR request and PHR request may be transmitted, for example, via the PDCCH within a DL burst of a DL-centric slot or an UL-centric slot. At 606, the scheduled entity 106 may then transmit the BSR and PHR to the scheduling entity 108. The BSR includes information on how much user data traffic is in the scheduled entity buffer waiting to be sent to the scheduling entity 108. The PHR indicates how much transmission power is left for a scheduled entity to use after subtracting the power being utilized by a current transmission.

Based on the BSR and PHR, the scheduling entity 108 may then allocate a set of one or more resource elements (e.g. which may correspond to one or more resource blocks or resource block groups) to the scheduled entity 106, and at 608, transmit scheduling information corresponding to the uplink grant (e.g., information indicative of the assigned resource elements) to the scheduled entity 106. The scheduling information may be transmitted, for example, via the PDCCH within a DL burst of a DL-centric slot or an UL-centric slot. In some examples, the scheduling information may be masked (scrambled) with the cell radio network temporary identifier (C-RNTI) of the scheduled entity. At 610, the scheduled entity 106 may then utilize the assigned uplink resource element(s) to transmit the data (traffic) to the scheduling entity 108 via the PUSCH. The assigned uplink resources for the traffic may be within the same slot as the PDCCH carrying the scheduling information (e.g., when the PDCCH is transmitted in an UL-centric slot) or within a subsequent slot (e.g., when the PDCCH is transmitted in a DL-centric slot).

Figure 7:
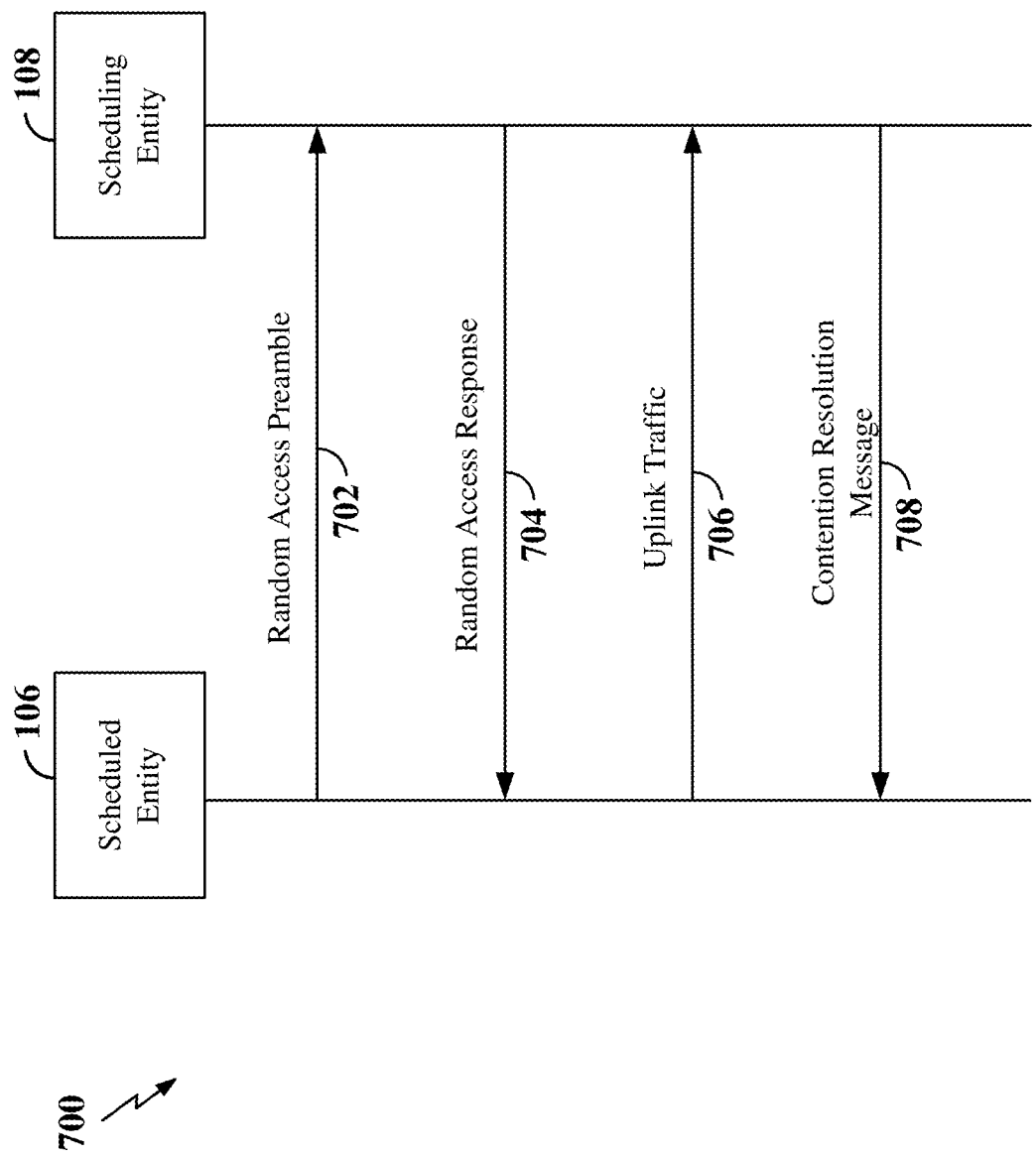
FIG. 7 is a signaling diagram illustrating exemplary signaling for random access scheduling.

Another type of scheduling utilizes the Physical Random Access Channel (PRACH). The PRACH may be used, for example, in a random access procedure during initial access of the uplink FIG. 7 is a diagram illustrating an example of a contention based random access procedure 700 according to some embodiments. The random access procedure 700 shown in FIG. 7 is initiated by the scheduled entity 106 randomly selecting a preamble from an available set of preambles within the cell served by the scheduling entity 108, and transmitting the selected preamble to the scheduling entity 108 in a RACH preamble message 702. In an example, the scheduled entity 106 may select from 64 possible preamble sequences for inclusion in the RACH preamble message 702.

If the preamble is successfully detected by the scheduling entity 108, the scheduling entity 108 transmits a random access response (RAR) message 704 to the scheduled entity 106 on the physical downlink control channel (PDCCH). The RAR message 704 includes an identifier of the preamble sent by the scheduled entity 106, a Timing Advance (TA), a temporary cell radio network temporary identifier (TC-RNTI) or random access (RA) RNTI for the scheduled entity 106 and a grant of assigned uplink resources. Upon receipt of the RAR message 704, the scheduled entity 106 compares the preamble ID to the preamble sent by the scheduled entity in the RACH preamble message 702. If the preamble ID matches the preamble sent in the RACH preamble message 702, the scheduled entity 106 applies the timing advance and starts a contention resolution procedure.

Since the preamble is selected randomly by the scheduled entity, if another scheduled entity selects the same preamble in the same RACH resource, a collision may result between the two scheduled entities. Any collisions may then be resolved using the contention resolution procedure. During contention resolution, the scheduled entity 106 transmits uplink data (traffic) 706 on the common control channel (CCCH) using the TA and assigned uplink resources. The uplink traffic 706 includes an identifier of the scheduled entity 106 for use by the scheduling entity in resolving any collisions. Although other scheduled entities may transmit colliding uplink transmissions utilizing the TA and assigned uplink resources, these colliding uplink transmissions will likely not be successfully decoded at the scheduling entity since the colliding uplink transmissions were transmitted with TAs that were not intended for those scheduled entities.

Upon successfully decoding the uplink traffic, the scheduling entity 108 transmits a contention resolution message 708 to the scheduled entity 106. The contention resolution message 708 may be, for example, an RRC-Connection Setup message. In addition, the contention resolution message 708 includes the identifier of the scheduled entity 106 that was received in the uplink traffic 706. The scheduled entity 106, upon receiving its own identity back in the contention resolution message 708, concludes that the random access procedure was successful and completes the RRC connection setup process. Any other scheduled entity receiving the RRC-Connection Setup message 708 with the identity of the scheduled entity 106 will conclude that the random access procedure failed and re-initialize the random access procedure.

Each of the above types of scheduling works well for many types of uplink transmissions. However, semi-persistent, dynamic and/or PRACH scheduling may not be ideal for low-latency (urgent) uplink transmissions that are not periodic in nature due to the delay and overhead requirements. Therefore, in accordance with various aspects of the present disclosure, instead of scheduling an uplink transmission, a scheduled entity may transmit uplink user data traffic in an opportunistic manner. To facilitate opportunistic uplink transmissions, the scheduling entity may identify a set of unused uplink resources within a slot and transmit unused resource information identifying the set of unused uplink resources within the slot. As used herein, the term unused uplink resources refers to uplink resource blocks and/or uplink resource block groups that are not scheduled and not allocated for any other use. In some examples, the unused resource information may be broadcast by the scheduling entity within the PDCCH or SIB. Upon receiving the unused resource information, a scheduled entity with user data traffic to transmit may transmit an opportunistic uplink transmission including the user data traffic within the set of unused resources to the scheduling entity.

In some examples, a scheduled entity may be configured to operate in a regular mode to schedule a regular uplink transmission (e.g., utilizing SPS, dynamic or PRACH), in an opportunistic mode to initiate an opportunistic uplink transmission, or in both the regular mode and opportunistic mode. In some examples, for the opportunistic mode-capable scheduled entities, the scheduling entity may enable or disable the opportunistic mode of those scheduled entities based on, for example, the historical uplink resource usage and/or current traffic conditions within the cell. While operating in the opportunistic mode, the scheduled entity may determine whether to initiate an opportunistic uplink transmission. For example, the scheduled entity may consider whether the scheduled entity has user data traffic to transmit to the scheduling entity, the number of resource blocks available within the set of unused uplink resources, and/or whether the scheduled entity already has a regular uplink transmission grant when determining whether to utilize the set of unused uplink resources for an opportunistic uplink transmission. In some examples, the opportunistic uplink transmission may include one or more of a contention-free PUSCH (e.g., user data traffic) transmission, a scheduling request transmission or a random access request transmission.

Figure 8:
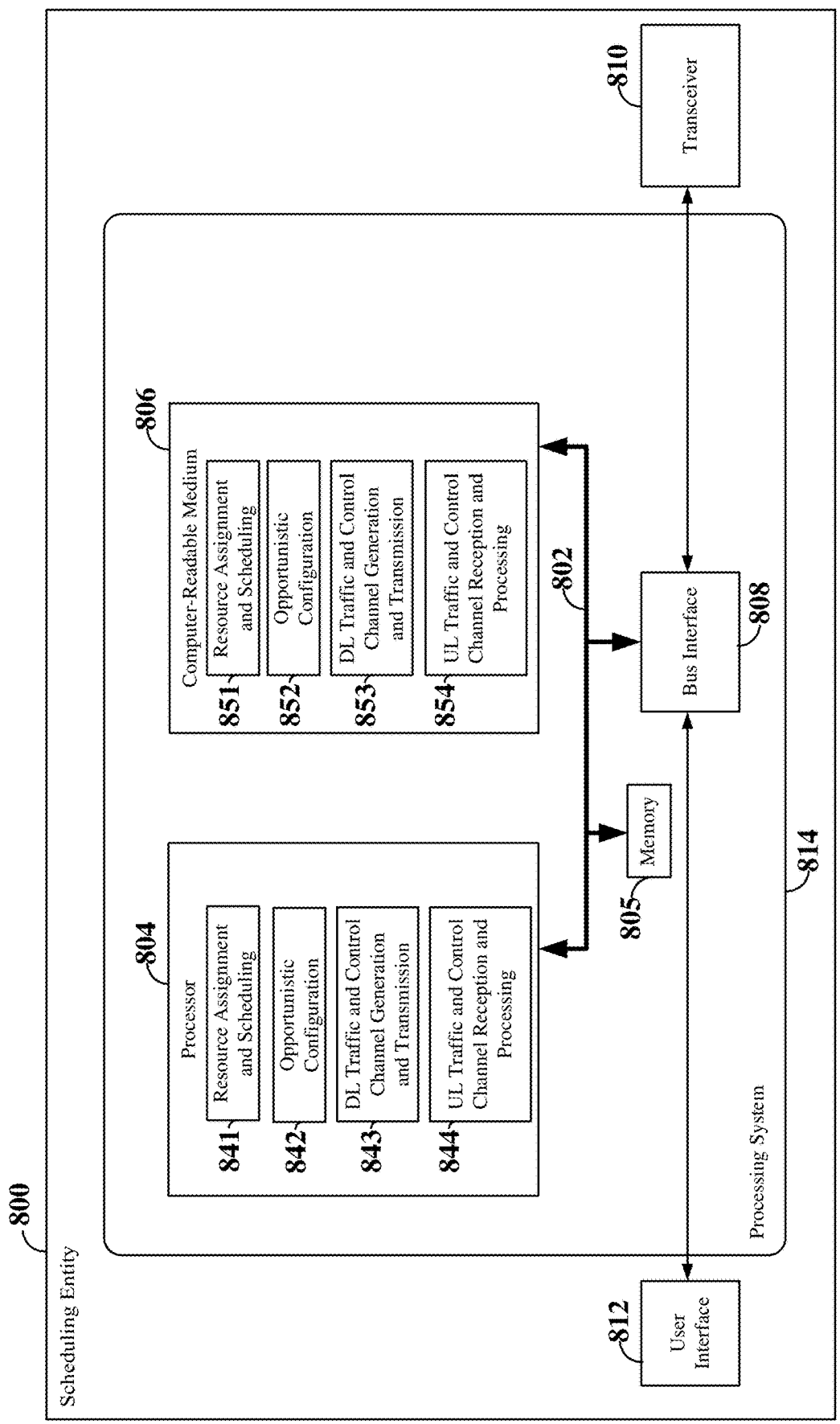
FIG. 8 is a block diagram illustrating an example of a hardware implementation for a scheduling entity employing a processing system according to some aspects of the present disclosure.

FIG. 8 is a conceptual diagram illustrating an example of a hardware implementation for an exemplary scheduling entity 800 employing a processing system 814. For example, the scheduling entity 800 may be a next generation (5G) base station as illustrated in any one or more of FIGS. 1 and 2. In another example, the scheduling entity 800 may be a user equipment (UE) as illustrated in any one or more of FIGS. 1 and 2.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes described below.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium (e.g., air interface). Depending upon the nature of the apparatus, a user interface 812 (e.g., keypad, display, speaker, microphone, joystick) may also be provided. Of course, such a user interface 812 is optional, and may be omitted in some examples, such as a base station.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include resource assignment and scheduling circuitry 841, configured to generate, schedule, and modify a resource assignment or grant of time-frequency resources (e.g., a set of one or more resource elements). For example, the resource assignment and scheduling circuitry 841 may schedule time-frequency resources within a plurality of time division duplex (TDD) and/or frequency division duplex (FDD) subframes or slots to carry user data traffic and/or control information to and/or from multiple UEs (scheduled entities).

In some examples, the resource assignment and scheduling circuitry 841 may be configured to schedule an uplink grant for a scheduled entity. For example, the resource assignment and scheduling circuitry 841 may be configured to schedule a semi-persistent scheduling (SPS) uplink grant, a dynamic uplink grant and/or a random access uplink grant. In some examples, the resource assignment and scheduling circuitry 841 may configure the dynamic uplink grant (e.g., allocate the set of resource elements to the dynamic uplink grant) in response to receiving a scheduling request from the scheduled entity. The resource assignment and scheduling circuitry 841 may further operate in coordination with resource assignment and scheduling software 851.

The processor 804 may further include opportunistic configuration circuitry 842, configured to support opportunistic uplink transmissions by scheduled entities. For example, after the resource assignment and scheduling circuitry 841 schedules all regular uplink transmissions (e.g., dynamic, SPS, and/or random access) within a slot (e.g., a DL-centric slot or an UL-centric slot), the opportunistic configuration circuitry 842 may be configured to identify any unused uplink resources (e.g., resource blocks within the PUSCH and/or PUCCH) and generate unused resource information identifying the unused uplink resources. The unused resource information may have a resource granularity of a single resource block or a resource block group. In some examples, the unused resource information may include a bit map, where each bit indicates one resource block or one resource block group that is either in use or not in use within the slot. In other examples, the unused resource information may include a set of resource block indices or resource block group indices and an indicator bit that indicates whether the resource blocks associated with the resource block indices or resource block groups associated with the resource block indices are in use or not in use. For example, the unused resource information may include b, i0, i1, i2, . . . , iN, where b is the indicator bit and i0, i1, i2, . . . , iN are the resource block or resource block group indices. In some examples, when b=0, the resource blocks or resource block groups associated with the included indices i0, i1, i2, . . . , iN are unused resources and when b=1, the resource blocks or resource block groups associated with the included indices i0, i1, i2, . . . , iN are used resources.

The set of unused uplink resources may further be divided into different resource pools, with each pool including uplink resources for a particular type of uplink transmission. Examples of uplink transmission types include PUSCH (user data traffic) uplink transmissions, scheduling request uplink transmissions, and random access request uplink transmission. The unused resource information may further indicate the particular unused uplink resources allocated to each resource pool. For example, the unused resource information may include first unused resource information identifying PUSCH resources within the set of unused uplink resources, scheduling request resources within the set of unused uplink resources, and random access channel resources within the set of unused uplink resources.

The opportunistic configuration circuitry 842 may further be configured to determine whether to enable or disable an opportunistic mode on each scheduled entity within the cell served by the scheduling entity. For example, the opportunistic configuration circuitry 842 may identify the scheduled entities within the cell that support the opportunistic mode and then enable or disable the opportunistic mode on each of those scheduled entities. The opportunistic configuration circuitry 842 may enable or disable the opportunistic mode based on, for example, historical uplink resource usage and/or current traffic conditions within the cell. When the opportunistic mode is disabled on a scheduled entity, the scheduled entity is prevented from transmitting opportunistic uplink transmissions, but may operate in a regular mode to transmit grant-based uplink transmissions (e.g., PUSCH, buffer status report or power headroom report). In the regular mode, the scheduled entity may further transmit scheduling requests and random access requests within regular uplink resources (e.g., uplink resources designated for scheduling requests and random access requests).

To reduce processing of opportunistic uplink transmissions, the opportunistic configuration circuitry 842 may further be configured to designate limited locations within the set of unused resources at which opportunistic uplink transmissions may begin. For example, the opportunistic configuration circuitry 842 may set a granularity of four resource blocks for each opportunistic transmission, thus requiring opportunistic uplink transmissions to start at the beginning of a four resource block (RB) section (e.g., RB0, RB4, RB8, RB12, etc.). The opportunistic configuration circuitry 842 may further signal a starting resource block and the resource block granularity in the unused resource information.

The processor 804 may further include downlink (DL) traffic and control channel generation and transmission circuitry 843, configured to generate and transmit downlink user data traffic and control channels within one or more subframes or slots. The DL traffic and control channel generation and transmission circuitry 843 may operate in coordination with the resource assignment and scheduling circuitry 841 to place the DL user data traffic and/or control information onto a time division duplex (TDD) or frequency division duplex (FDD) carrier by including the DL user data traffic and/or control information within one or more subframes or slots in accordance with the resources assigned to the DL user data traffic and/or control information.

For example, the DL traffic and control channel generation and transmission circuitry 843 may be configured to generate a physical downlink control channel (PDCCH) (or Enhanced PDCCH (ePDCCH)) including downlink control information (DCI). In some examples, each DCI may include control information indicating an assignment of downlink resources for downlink user data traffic or a grant of uplink resources for one or more scheduled entities. The DL traffic and control channel generation and transmission circuitry 843 may further be configured to generate a physical downlink shared channel (PDSCH) (or Enhanced PDSCH (ePDSCH)) including downlink user data traffic.

In various aspects of the present disclosure, the DL traffic and control channel generation and transmission circuitry 843 may further be configured to transmit the unused resource information generated by the opportunistic configuration circuitry 842 for a current slot (e.g., DL-centric or UL-centric) to the scheduled entities within the cell. In some examples, the DL traffic and control channel generation and transmission circuitry 843 may broadcast the unused resource information within, for example, the PDCCH, a system information block (SIB), or a master information block (MIB) of a physical broadcast channel (PBCH) included within the DL burst of the current slot. For example, the DL traffic and control channel generation and transmission circuitry 843 may broadcast the unused resource information within the common search space for the PDCCH. The common search space consists of resource elements used for sending control information that is common to a group of scheduled entities. Thus, the common search space is monitored by all scheduled entities in a cell and is typically static between slots. Each scheduled entity may blind decode over the common search space to retrieve the unused resource information.

The DL traffic and control channel generation and transmission circuitry 843 may further be configured to transmit opportunistic mode information generated by the opportunistic configuration circuitry 842 for a scheduled entity that indicates whether to enable or disable the opportunistic mode on the scheduled entity. For example, the opportunistic mode information may include a single bit that turns on/off the opportunistic mode on the scheduled entity. The opportunistic mode information may be transmitted to the scheduled entity, for example, via RRC signaling or within a physical downlink control channel (PDCCH).

The DL traffic and control channel generation and transmission circuitry 843 may further be configured to generate and transmit feedback information (e.g., ACK/NACK) to a scheduled entity in response to receiving an opportunistic PUSCH uplink transmission from the scheduled entity. The DL traffic and control channel generation and transmission circuitry 843 may further be configured to generate and transmit an uplink grant in response to receiving an opportunistic scheduling request or a random access response in response to receiving an opportunistic random access request. For example, the DL traffic and control channel generation and transmission circuitry may transmit the feedback information for opportunistic PUSCH transmissions and the uplink grants for opportunistic scheduling request transmissions within the PDCCH (DL burst) of the next slot. The PDCCH may be scrambled with the C-RNTI of the scheduled entity. For opportunistic random access requests, the DL traffic and control channel generation and transmission circuitry 843 may transmit the random access response within the PDCCH of the next slot, which may be scrambled with the temporary C-RNTI (TC-RNTI) corresponding to the opportunistic random access request. The DL traffic and control channel generation and transmission circuitry 843 may further operate in coordination with DL traffic and control channel generation and transmission software 853.

The processor 804 may further include uplink (UL) traffic and control channel reception and processing circuitry 844, configured to receive and process uplink control channels and uplink traffic channels from one or more scheduled entities. In general, the UL traffic and control channel reception and processing circuitry 844 may operate in coordination with the resource assignment and scheduling circuitry 841 to schedule UL user data traffic transmissions, DL user data traffic transmissions and/or DL user data traffic retransmissions in accordance with the received UL control information. For example, the UL traffic and control channel reception and processing circuitry 844 may be configured to receive a regular dynamic scheduling request, a request for an SPS uplink grant, or a random access request from a scheduled entity. The UL traffic and control channel reception and processing circuitry 844 may further be configured to provide the scheduling request, SPS uplink grant request, or random access request to the resource assignment and scheduling circuitry 841 for processing.

The UL traffic and control channel reception and processing circuitry 844 may further be configured to receive regular uplink user data traffic from one or more scheduled entities. In some examples, the UL traffic and control channel reception and processing circuitry 844 may receive regular user data traffic from a scheduled entity within a set of resource elements allocated to the scheduled entity. For dynamic or SPS uplink grants, the UL traffic and control channel reception and processing circuitry 844 may receive user data traffic from the scheduled entity in accordance with the set of resource elements allocated to the dynamic or SPS uplink grant. In some examples, the scheduling information indicating the allocated set of resource elements may be included at the beginning of an UL-centric slot and the scheduled user data traffic may be received by the UL traffic and control channel reception and processing circuitry 844 within the same UL-centric slot.

The UL traffic and control channel reception and processing circuitry 844 may further be configured to receive opportunistic uplink transmissions within a set of unused uplink resources. In some examples, the opportunistic uplink transmissions may include grant-free user data traffic (e.g., grant-free PUSCH), buffer status reports, power headroom reports, scheduling requests, extended scheduling requests (e.g., multi-bit scheduling requests), and/or random access requests (e.g., PRACH). If the opportunistic uplink transmission from a scheduled entity includes user data traffic (e.g., contention-free PUSCH), the opportunistic uplink transmission may further include opportunistic transmission information at the beginning of the opportunistic uplink transmission. The opportunistic transmission information may include, for example, resource block information identifying the resource block(s) utilized for the opportunistic uplink transmission and a modulation and coding scheme (MCS) selected for the opportunistic uplink transmission. In some examples, the opportunistic transmission information may be encoded with a fixed MCS and resource block configuration to enable the UL traffic and control channel reception and processing circuitry 844 to identify and decode the opportunistic transmission information for use in decoding the remainder of the opportunistic uplink transmission.

If the set of unused uplink resources is divided into different resource pools, with each pool including uplink resources for a particular type of uplink transmission, each opportunistic uplink transmission received by the UL traffic and control channel reception and processing circuitry 844 may be received within the uplink resources designated for the particular type of opportunistic uplink transmission. For example, opportunistic PUSCH transmissions may be received within the unused resources designated for PUSCH transmissions, opportunistic scheduling request transmissions may be received within the unused resources designated for scheduling requests, and opportunistic uplink transmissions may be received within the unused resources designated for random access requests.

Since the UL traffic and control channel reception and processing circuitry 844 is unaware of whether an opportunistic uplink transmission exists in a current slot (e.g., DL-centric slot or UL-centric slot) or the size of the opportunistic uplink transmission, the UL traffic and control channel reception and processing circuitry 844 may further be configured to perform blind decoding of the unused uplink resources. To limit the number of blind decodes, and therefore reduce processing by the UL traffic and control channel reception and processing circuitry 844, the opportunistic uplink transmissions may begin at designated (predefined) locations within the set of unused resources and may be of a preconfigured size (e.g., number of resource blocks), as determined by the starting location (e.g., starting resource block) and resource block granularity provided by the opportunistic configuration circuitry 842. For example, if the opportunistic configuration circuitry 842 sets a granularity of four resource blocks for each opportunistic transmission, the UL traffic and control channel reception processing circuitry 844 may be configured to blind decode each section of four resource blocks (e.g., RB0-RB3, RB4-RB7, RB8-RB11, etc.). If more than one starting location/granularity is allowed, each opportunistic uplink transmission may further include a length-dependent demodulation reference signal (DMRS). For example, a length-dependent DMRS may include a sequence length that is dependent upon the size of the opportunistic uplink transmission, which therefore enables the UL traffic and control channel reception and processing circuitry 844 to detect the number of resource blocks utilized for the opportunistic uplink transmission and perform corresponding channel estimation.

In addition, to manage potential collisions between opportunistic PUSCH and scheduling request uplink transmissions, the opportunistic uplink transmissions may be code-division multiplexed with randomly selected shifts. For example, for uplink user data traffic, buffer status reports and power headroom reports, the opportunistic uplink transmissions may each include a respective DMRS that may be code-division multiplexed with DMRS of other opportunistic uplink transmissions to enable the UL traffic and control channel reception and processing circuitry 844 to decode each DMRS and perform channel estimation for each opportunistic uplink transmission. The UL traffic and control channel reception and processing circuitry 844 may then perform joint detection and demodulation of each opportunistic uplink transmission based on the respective channel estimations. Similarly, opportunistic scheduling request uplink transmissions may be code-division multiplexed with other opportunistic uplink transmissions to enable the UL traffic and control channel reception and processing circuitry 844 to decode the opportunistic scheduling request uplink transmissions.

If a particular scheduled entity lacks a timing advance (e.g., the DL traffic and control channel generation and transmission circuitry 843 has not provided the scheduled entity with a timing advance calculated by the scheduling entity 800), the opportunistic uplink transmission may include an extended cyclic prefix (CP) to account for potential long propagation delays. For example, in LTE, a normal CP has a duration of 4.7 μs, while an extended CP has a duration of 16.67 μs. The CP is typically generated by copying a small part of the end of an OFDM symbol to the beginning of the OFDM symbol, which operates as a guard band between OFDM symbols to enable the UL traffic and control channel reception and processing circuitry 844 to identify the end of each OFDM symbol and correctly correlate multipath components of an uplink transmission. In some examples, opportunistic uplink transmissions from scheduled entities that lack timing advances may be limited to only random access opportunistic uplink transmissions. Thus, opportunistic PUSCH/scheduling request uplink transmissions may not be allowed from scheduled entities that have not been provided timing advances. The UL traffic and control channel reception and processing circuitry 844 may further operate in coordination with UL traffic and control channel reception and processing software 854.

Figure 9:
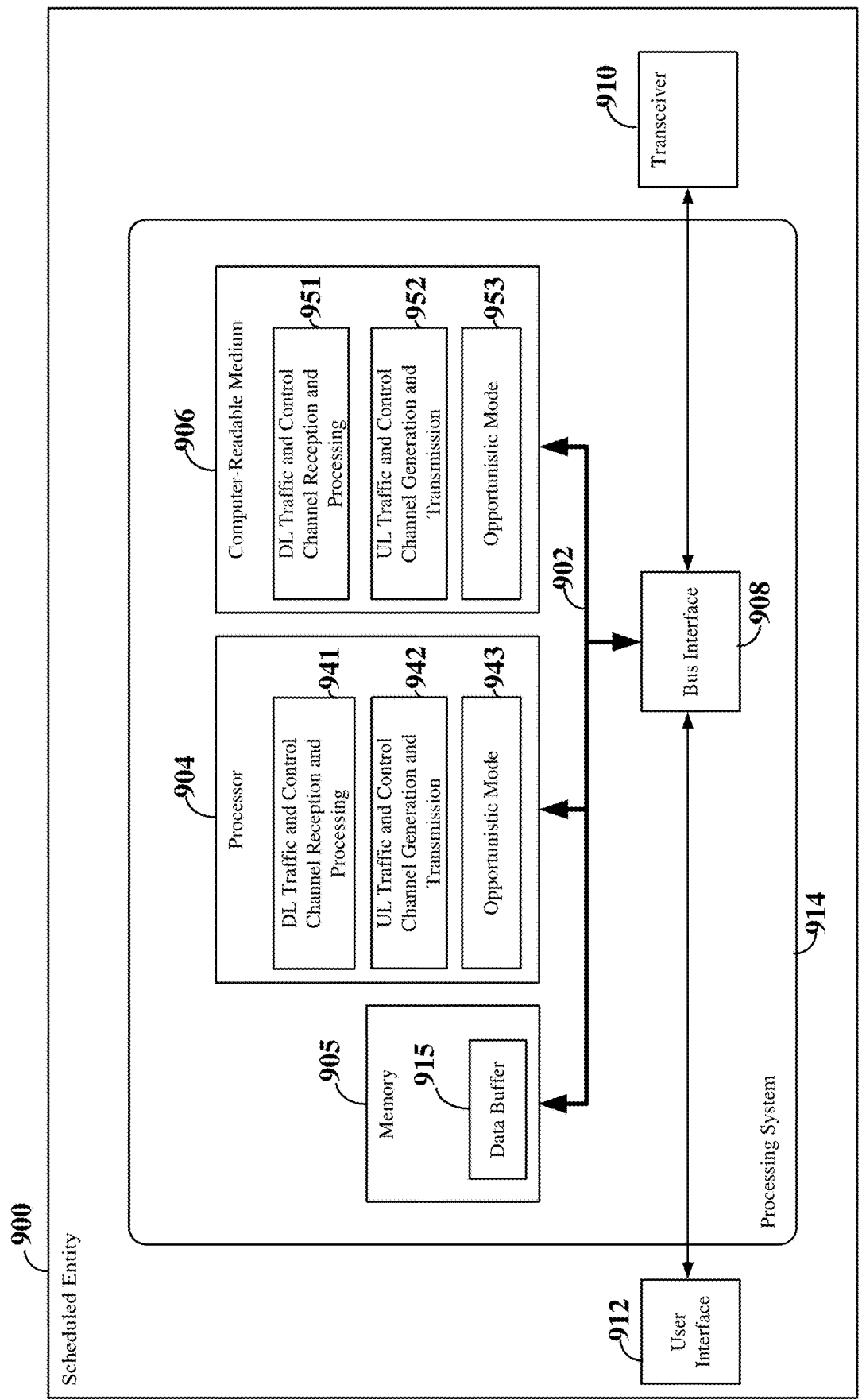
FIG. 9 is a block diagram illustrating an example of a hardware implementation for a scheduled entity employing a processing system according to some aspects of the present disclosure.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of FIGS. 1 and 2.

The processing system 914 may be substantially the same as the processing system 814 illustrated in FIG. 8, including a bus interface 908, a bus 902, memory 905, a processor 904, and a computer-readable medium 906. Furthermore, the scheduled entity 900 may include a user interface 912 and a transceiver 910 substantially similar to those described above in FIG. 8. That is, the processor 904, as utilized in a scheduled entity 900, may be used to implement any one or more of the processes described below.

In some aspects of the disclosure, the processor 904 may include downlink (DL) traffic and control channel reception and processing circuitry 941, configured for receiving and processing downlink user data traffic on a downlink traffic channel, and to receive and process control information on one or more downlink control channels. For example, the DL traffic and control channel reception and processing circuitry 941 may be configured to receive downlink control information (DCI) (e.g., within a PDCCH) including one or more dynamic or SPS uplink grants.

In various aspects of the present disclosure, the DL traffic and control channel reception and processing circuitry 941 may further be configured to receive unused resource information identifying a set of unused uplink resources within a current slot. In some examples, the unused resource information may include a bit map, where each bit indicates one resource block or one resource block group that is either in use or not in use within the slot. In other examples, the unused resource information may include a set of resource block indices or resource block group indices and an indicator bit that indicates whether the resource blocks or resource block groups associated with the set of indices are in use or not in use. The unused resource information may further indicate resource pools within the set of unused resources, with each pool including uplink resources for a particular type of uplink transmission. In addition, the unused resource information may further include a starting resource block and a resource block granularity for opportunistic uplink transmissions.

The unused resource information may be received, for example, within the PDCCH, system information block (SIB), or master information block (MIB) of a physical broadcast channel (PBCH) included within the DL burst of the current slot. For example, the DL traffic and control channel reception and processing circuitry 941 may receive the unused resource information within the common search space for the PDCCH. The DL traffic and control channel reception and processing circuitry 941 may then blind decode over the common search space to retrieve the unused resource information.

The DL traffic and control channel reception and processing circuitry 941 may further receive opportunistic mode information from the scheduling entity and provide the opportunistic mode information to opportunistic mode circuitry 943 to enable or disable the opportunistic mode on the scheduled entity 900. For example, the opportunistic mode information may include a single bit that turns on/off the opportunistic mode on the scheduled entity 900. When the opportunistic mode is disabled on the scheduled entity, the scheduled entity is prevented from transmitting opportunistic uplink transmissions, but may operate in a regular mode if the scheduled entity is configured to operate in a regular mode. In some aspects of the present disclosure, the scheduled entity may be configured to operate in regular mode only (e.g., opportunistic mode is not available on the scheduled entity), opportunistic mode only (e.g., regular mode is not available on the scheduled entity), or in both regular mode and opportunistic mode (e.g., when the opportunistic mode is enabled on the scheduled entity). The DL traffic and control channel reception and processing circuitry 941 may operate in coordination with DL traffic and control channel reception and processing software 951.

The processor 904 may further include uplink (UL) traffic and control channel generation and transmission circuitry 942, configured to generate and transmit uplink control/feedback/acknowledgement information on an UL control channel in the regular mode. For example, the UL traffic and control channel generation and transmission circuitry 942 may be configured to generate and transmit an uplink control channel (e.g., a Physical Uplink Control Channel (PUCCH)) on allocated uplink resources. In some examples, the UL traffic and control channel generation and transmission circuitry 942 may be configured to detect the presence of user data traffic in an uplink buffer (e.g., data buffer 915) and to generate and transmit a dynamic scheduling request to a scheduling entity to request uplink resources (e.g., a set of one or more uplink resource elements) for transmitting the user data traffic to the scheduling entity. The UL traffic and control channel generation and transmission circuitry 942 may further be configured to generate and transmit a request for an SPS uplink grant for periodic transmissions. In addition, the UL traffic and control channel generation and transmission circuitry 942 may be configured to generate and transmit a random access request.

The UL traffic and control channel generation and transmission circuitry 942 may further be configured to generate and transmit uplink user data traffic on an UL traffic channel (e.g., a PUSCH) in accordance with an uplink grant in the regular mode. In some examples, the UL traffic and control channel generation and transmission circuitry 942 may utilize the respective allocated resources for an uplink grant to transmit uplink user data traffic in accordance with the uplink grant.

In various aspects of the present disclosure, the UL traffic and control channel generation and transmission circuitry 942 may further operate in coordination with the opportunistic mode circuitry 943 to generate and transmit an opportunistic uplink transmission when the opportunistic mode is enabled on the scheduled entity. The opportunistic uplink transmission may include grant-free user data traffic (e.g., grant-free PUSCH), buffer status reports, power headroom reports, scheduling requests, extended scheduling requests (e.g., multi-bit scheduling requests), and/or random access requests (e.g., PRACH).

The opportunistic mode circuitry 943 may determine whether or not to transmit uplink channels within the set of unused resources of a current slot in an opportunistic fashion based on various factors. For example, the opportunistic mode circuitry 943 may instruct the UL traffic and control channel generation and transmission circuitry 942 to generate and transmit an opportunistic uplink transmission based on the uplink traffic needs of the scheduled entity (e.g., whether the scheduled entity has uplink user data traffic in the data buffer 915 to transmit).

The opportunistic mode circuitry 943 may further consider whether the scheduled entity already has an uplink grant within the current slot to transmit uplink user data traffic when determining whether to utilize the unused uplink resources for an opportunistic uplink transmission. For example, if the scheduled entity does have an uplink grant within the current slot, the opportunistic mode circuitry 943 may decide to not transmit an opportunistic uplink transmission in the current slot. However, if the scheduled entity has urgent user data traffic to transmit that is not associated with the uplink grant, the opportunistic mode circuitry 943 may instruct the UL traffic and control channel generation and transmission circuitry 942 to generate and transmit the urgent user data traffic in an opportunistic uplink transmission.

The opportunistic mode circuitry 943 may further consider the number of resource blocks available in the set of unused resources when deciding whether to utilize the set of unused resources for an opportunistic uplink transmission. For example, if the number of resource blocks within the set of unused uplink resources is greater than a threshold and the scheduled entity has user data traffic to be transmitted to the scheduling entity, the opportunistic mode circuitry 943 may instruct the UL traffic and control channel generation and transmission circuitry 942 to generate and transmit an opportunistic uplink transmission within the set of unused resources of the current slot.

If the opportunistic uplink transmission includes user data traffic (e.g., contention-free PUSCH), the opportunistic uplink transmission may further include opportunistic transmission information at the beginning of the opportunistic uplink transmission. The opportunistic transmission information may include, for example, resource block information identifying the resource block(s) utilized for the opportunistic uplink transmission and a modulation and coding scheme (MCS) selected for the opportunistic uplink transmission. In some examples, the opportunistic transmission information may be encoded with a fixed MCS and resource block configuration to enable the scheduling entity to identify and decode the opportunistic transmission information for use in decoding the remainder of the opportunistic uplink transmission.

If the unused resource information identifies resource pools for different types of uplink transmissions, the opportunistic uplink transmission may be transmitted within the uplink resources designated for the particular type of opportunistic uplink transmission. For example, opportunistic PUSCH transmissions may be transmitted within the unused resources designated for PUSCH transmissions, opportunistic scheduling request transmissions may be transmitted within the unused resources designated for scheduling requests, and opportunistic uplink transmissions may be transmitted within the unused resources designated for random access requests.

In addition, the opportunistic uplink transmission may begin at designated (pre-defined) locations within the set of unused resources and may be of a preconfigured size (e.g., number of resource blocks), as determined by the starting location (e.g., starting resource block) and resource block granularity signaled in the unused resource information. For example, if the granularity is four resource blocks for an opportunistic uplink transmission, the UL traffic and control channel generation and transmission circuitry 942 may be configured to transmit the opportunistic uplink transmission within at least one set of four resource blocks of the unused uplink resources. If more than one starting location/granularity is allowed, the opportunistic uplink transmission may further include a length-dependent demodulation reference signal (DMRS), which enables the scheduling entity to detect the number of resource blocks utilized for the opportunistic uplink transmission and perform corresponding channel estimation.

In addition, the opportunistic uplink transmissions may further be code-division multiplexed with a randomly selected shift. For example, for uplink user data traffic, buffer status reports and power headroom reports, the opportunistic uplink transmissions may include a DMRS that may be code-division multiplexed with DMRS of other opportunistic uplink transmissions. Similarly, an opportunistic scheduling request uplink transmission may be code-division multiplexed with other opportunistic uplink transmissions.

In some examples, if the scheduled entity lacks a timing advance (e.g., the DL traffic and control channel reception and processing circuitry 941 has not received a timing advance from the scheduling entity), the opportunistic uplink transmission may include an extended cyclic prefix (CP) to account for potential long propagation delays. In other examples, the opportunistic mode circuitry 943 may be configured (e.g., by the scheduling entity or pre-configured) to only transmit opportunistic random access uplink transmissions when the scheduled entity lacks a timing advance. The UL traffic and control channel generation and transmission circuitry 942 may operate in coordination with UL traffic and control channel generation and transmission software 952.

In response to an opportunistic PUSCH uplink transmission, the DL traffic and control channel reception and processing circuitry 941 may further be configured to receive feedback information (e.g., ACK/NACK) from the scheduling entity. The DL traffic and control channel reception and processing circuitry 941 may further be configured to receive an uplink grant in response to an opportunistic scheduling request or a random access response in response to an opportunistic random access request. For example, the DL traffic and control channel reception and processing circuitry 941 may receive the feedback information for opportunistic PUSCH transmissions and the uplink grants for opportunistic scheduling request transmissions within the PDCCH (DL burst) of the next slot. The PDCCH may be scrambled with the C-RNTI of the scheduled entity. For opportunistic random access requests, the DL traffic and control channel reception and processing circuitry 941 may receive the random access response within the PDCCH of the next slot, which may be scrambled with the temporary C-RNTI (TC-RNTI) corresponding to the opportunistic random access request.

Figure 10:
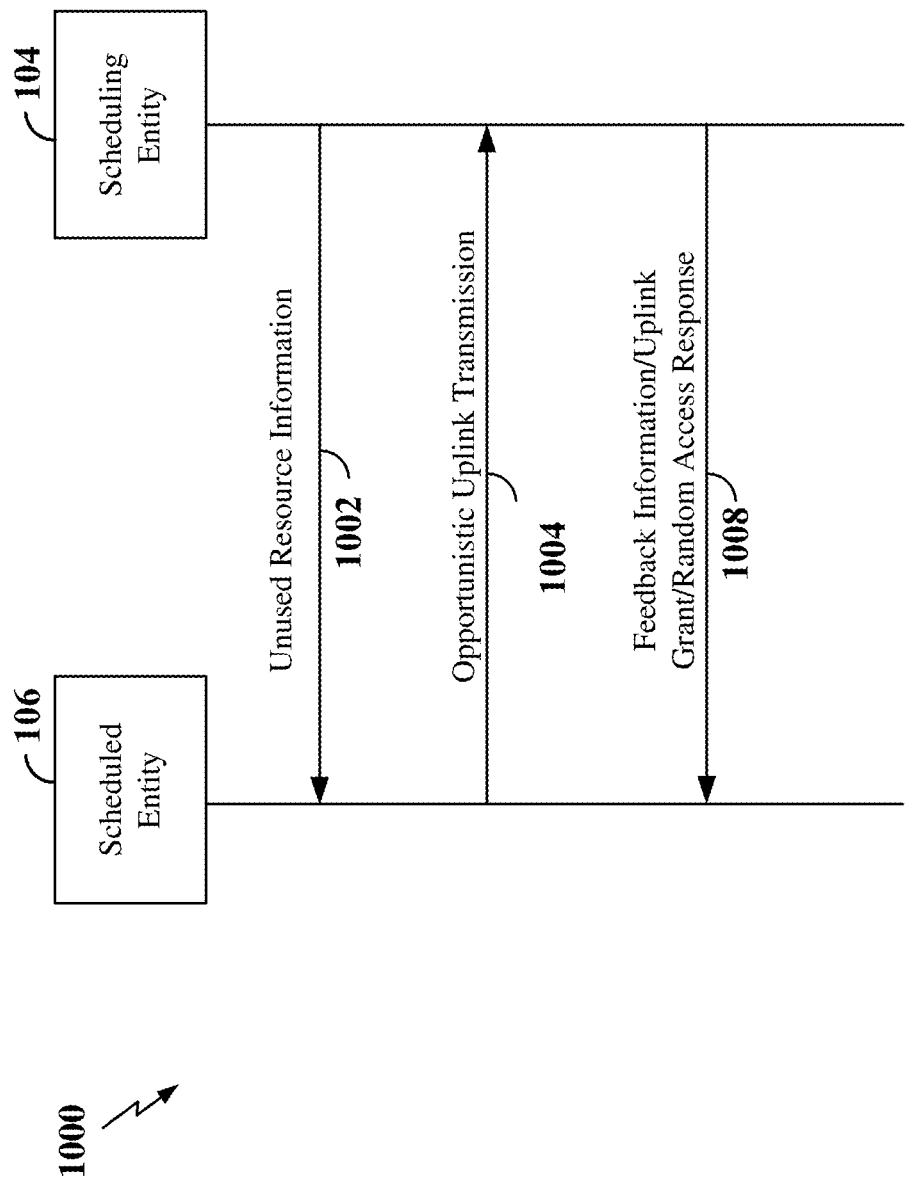
FIG. 10 is a diagram illustrating exemplary signaling for opportunistic uplink transmissions according to some aspects of the present disclosure.

FIG. 10 is a diagram illustrating exemplary signaling for opportunistic uplink transmissions according to some aspects of the present disclosure. As shown in FIG. 10, when there are unused uplink resources within a current slot, the scheduling entity 108 may transmit unused resource information 1002 to the scheduled entity 106. If the scheduled entity 106 has user data traffic to transmit to the scheduling entity 108, the scheduled entity may decide to utilize the set of unused resources to transmit an opportunistic uplink transmission 1004 to the scheduling entity. The opportunistic uplink transmission 1004 may include grant-free user data traffic (e.g., grant-free PUSCH), a buffer status report, a power headroom report, a scheduling request, an extended scheduling request (e.g., multi-bit scheduling requests), and/or a random access request (e.g., PRACH).

At 1008, the scheduling entity 108 may transmit feedback information (e.g., an ACK/NACK in response to received opportunistic uplink user data traffic), an uplink grant (e.g., in response to an opportunistic scheduling request) and/or a random access response (e.g., in response to an opportunistic random access request) to the scheduled entity 106. The feedback information and/or uplink grant may be included in a PDCCH that is scrambled with the C-RNTI of the scheduled entity 106. The random access response may be scrambled with the TC-RNTI corresponding to the opportunistic random access request.

Figure 11:
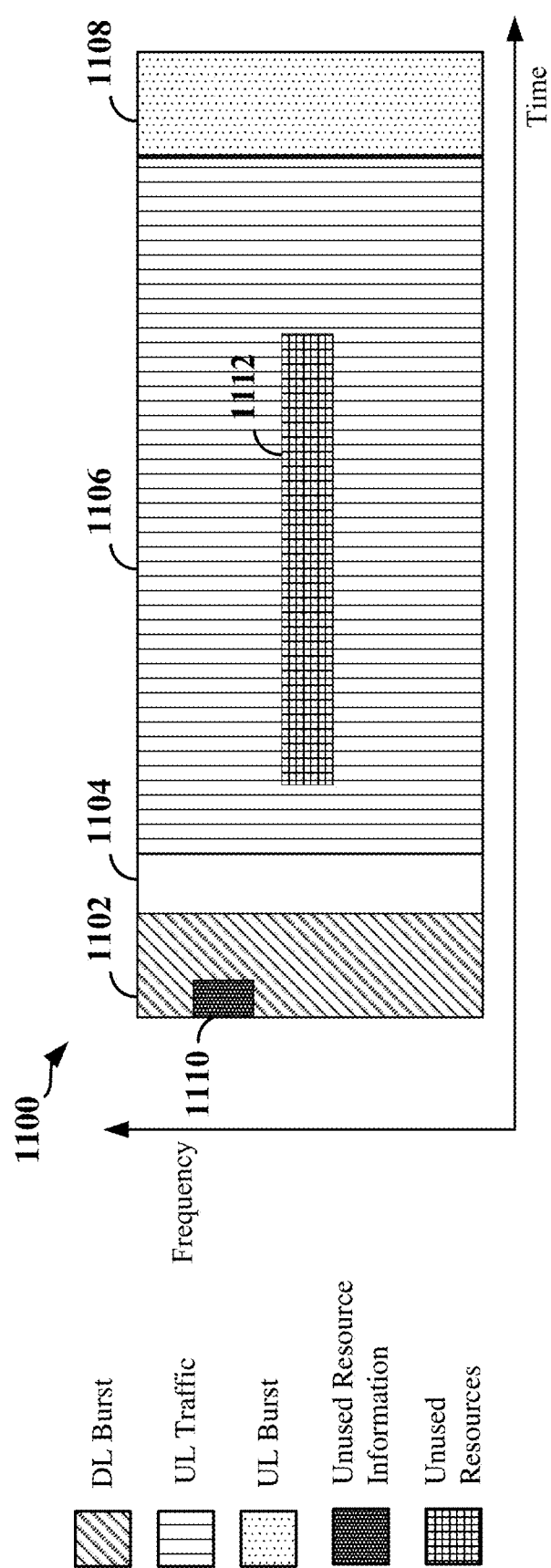
FIG. 11 is a diagram illustrating an example of an UL-centric slot including unused uplink resources according to some aspects of the present disclosure.

FIG. 11 illustrates a structure of an uplink-centric (UL-centric) slot 1100 including unused uplink resources according to some embodiments. In the example shown in FIG. 11, time is illustrated along a horizontal axis, while frequency is illustrated along a vertical axis. The time-frequency resources of the UL-centric slot 1000 may be divided into a DL burst 1102, an UL traffic portion 1106 and an UL burst 1108. A gap or guard period 1104 separates the end of the DL burst 1102 in time from the beginning of the UL traffic portion 1106.

The DL burst 1102 may exist in the initial or beginning portion of the UL-centric slot. The DL burst 1102 in FIG. 11 may be similar to the DL burst 502 described above with reference to FIG. 5. The DL burst 1102 of the UL-centric slot 1100 may also include unused resource information 1110 that indicates a set of unused uplink resources 1112 within the UL traffic portion 1106 and/or UL burst 1108. In the example shown in FIG. 11, the set of unused uplink resources 1112 is within the UL traffic portion 1106.

Upon receiving the unused resource information 1110 in the DL burst 1102 of the UL-centric slot 1100, a scheduled entity (UE) that is enabled in the opportunistic mode may transmit an opportunistic uplink transmission within the set of unused uplink resources 1112. For example, if the UE has user data traffic to transmit to the scheduling entity (base station), the UE may decide to transmit the user data traffic, a scheduling request for the user data traffic or a random access request for the user data traffic to the base station within the set of unused uplink resources 1112.

Figure 12:
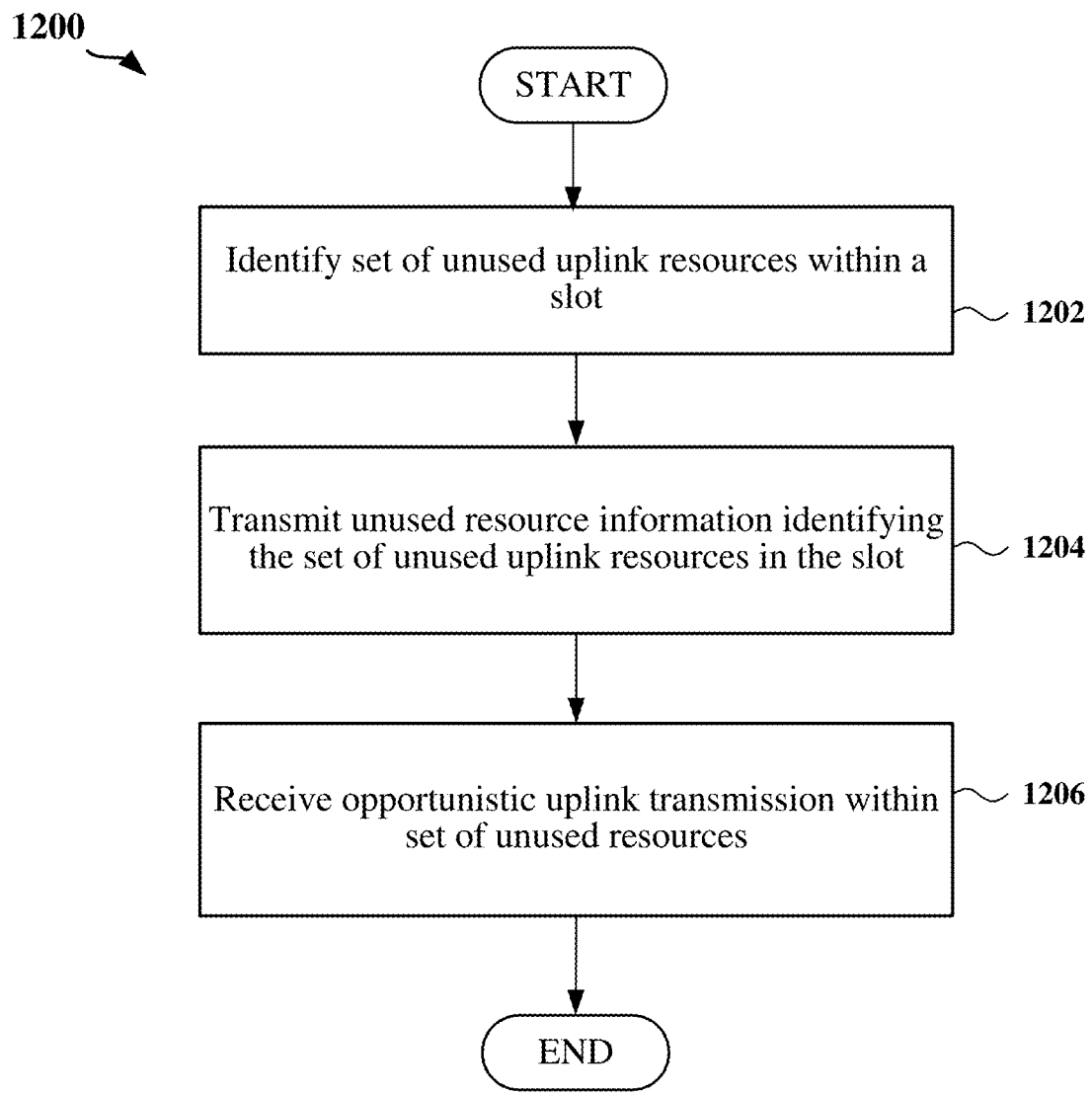
FIG. 12 is a flow chart of a method of enabling opportunistic uplink transmissions in a wireless communication network according to some aspects of the present disclosure.

FIG. 12 is a flow chart illustrating an exemplary process 1200 for enabling opportunistic uplink transmissions in a wireless communication network according to some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity illustrated in FIG. 8. In some examples, the process 1200 may be carried out by any suitable apparatus or means for carrying out the functions or algorithm described below.

At block 1202, the scheduling entity may identify a set of unused uplink resources within a slot (e.g., DL-centric or UL-centric). In some examples, the scheduling entity may schedule all regular uplink transmissions (e.g., dynamic, SPS, and/or random access) within a current slot and then identify any unused uplink resources (e.g., resource blocks within the PUSCH and/or PUCCH). For example, the opportunistic configuration circuitry 842, shown and described above in reference to FIG. 8, may identify the set of unused resources.

At block 1204, the scheduling entity may generate and transmit unused resource information identifying the set of unused uplink resources to the scheduled entities within the cell served by the scheduling entity. For example, the unused resource information may be broadcast within the common PDCCH or SIB in the DL burst of the current slot. For example, the opportunistic configuration circuitry 842 together with the DL traffic and control channel generation and transmission circuitry 843 and transceiver 810, shown and described above in reference to FIG. 8, may transmit the unused resource information.

At block 1206, the scheduling entity may receive an opportunistic uplink transmission from a scheduled entity within the set of unused resources. In some examples, the opportunistic uplink transmission may include grant-free user data traffic (e.g., grant-free PUSCH), a buffer status report, a power headroom report, a scheduling request, an extended scheduling request (e.g., multi-bit scheduling requests), and/or a random access request (e.g., PRACH). For example, the UL traffic and control channel reception and processing circuitry 844 and transceiver 810, shown and described above in reference to FIG. 8, may receive the opportunistic uplink transmission.

Figure 13:
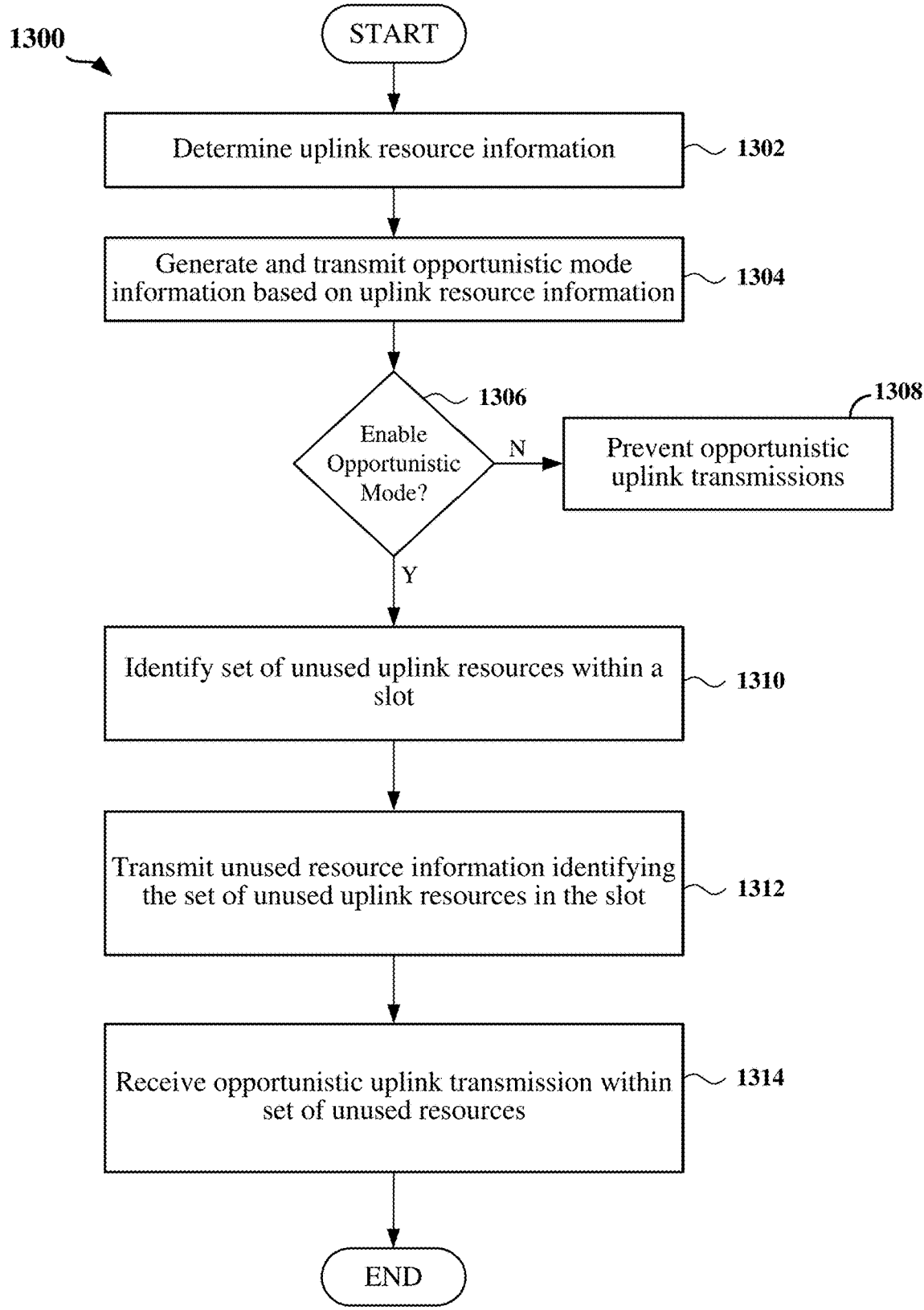
FIG. 13 is a flow chart of another method of enabling opportunistic uplink transmissions in a wireless communication network according to some aspects of the present disclosure.

FIG. 13 is a flow chart illustrating another exemplary process 1300 for enabling opportunistic uplink transmissions in a wireless communication network according to some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity illustrated in FIG. 8. In some examples, the process 1300 may be carried out by any suitable apparatus or means for carrying out the functions or algorithm described below.

At block 1302, the scheduling entity may determine uplink resource information, which may include historical uplink resource usage information and/or current traffic conditions. In some examples, the scheduling entity may determine a number or average number of unused uplink resource blocks (or a percentage or average percentage of unused uplink resource blocks) over a period of time (e.g., one or more consecutive slots, selected slots, historical data based on time of day, etc.). For example, the opportunistic configuration circuitry 842, shown and described above in reference to FIG. 8, may determine the uplink resource usage information.

At block 1304, the scheduling entity may generate and transmit opportunistic mode information based on the uplink resource information. The opportunistic mode information may indicate whether to enable or disable the opportunistic mode on one or more scheduled entities. In some examples, the scheduling entity may compare the uplink resource information to a threshold to determine the congestion (or historical congestion) in the cell and may set the opportunistic mode information to enable the opportunistic mode on the one or more scheduled entities when congestion in the cell is low. For example, the opportunistic configuration circuitry 842, shown and described above in reference to FIG. 8, may determine whether to enable the opportunistic mode.

If the scheduling entity determines to set the opportunistic mode information to disable the opportunistic mode (N branch of block 1306), at block 1308, the scheduling entity prevents opportunistic uplink transmissions in the cell. For example, the scheduling entity may transmit the opportunistic mode information including a single bit that turns off the opportunistic mode on scheduled entities in the cell. The opportunistic mode information may be transmitted to scheduled entities, for example, via RRC signaling or within a physical downlink control channel (PDCCH). When the opportunistic mode is disabled on a scheduled entity, the scheduled entity may still operate in a regular mode to transmit grant-based uplink transmissions (e.g., PUSCH, buffer status report or power headroom report), scheduling requests and random access requests within regular uplink resources (e.g., uplink resources designated for scheduling requests and random access requests). For example, the opportunistic configuration circuitry 842, shown and described above in reference to FIG. 8, may prevent opportunistic uplink transmissions in the cell.

If the scheduling entity determines to set the opportunistic mode information to enable the opportunistic mode (Y branch of block 1306), at block 1310, the scheduling entity may identify a set of unused uplink resources within a slot (e.g., DL-centric or UL-centric). In some examples, the scheduling entity may schedule all regular uplink transmissions (e.g., dynamic, SPS, and/or random access) within a current slot and then identify any unused uplink resources (e.g., resource blocks within the PUSCH and/or PUCCH). For example, the opportunistic configuration circuitry 842, shown and described above in reference to FIG. 8, may identify the set of unused resources.

At block 1312, the scheduling entity may generate and transmit unused resource information identifying the set of unused uplink resources to the scheduled entities within the cell served by the scheduling entity. For example, the unused resource information may be broadcast within the common PDCCH or SIB in the DL burst of the current slot. For example, the opportunistic configuration circuitry 842 together with the DL traffic and control channel generation and transmission circuitry 843 and transceiver 810, shown and described above in reference to FIG. 8, may transmit the unused resource information.

At block 1314, the scheduling entity may receive an opportunistic uplink transmission from a scheduled entity within the set of unused resources. In some examples, the opportunistic uplink transmission may include grant-free user data traffic (e.g., grant-free PUSCH), a buffer status report, a power headroom report, a scheduling request, an extended scheduling request (e.g., multi-bit scheduling requests), and/or a random access request (e.g., PRACH). For example, the UL traffic and control channel reception and processing circuitry 844 and transceiver 810, shown and described above in reference to FIG. 8, may receive the opportunistic uplink transmission.

Figure 14:
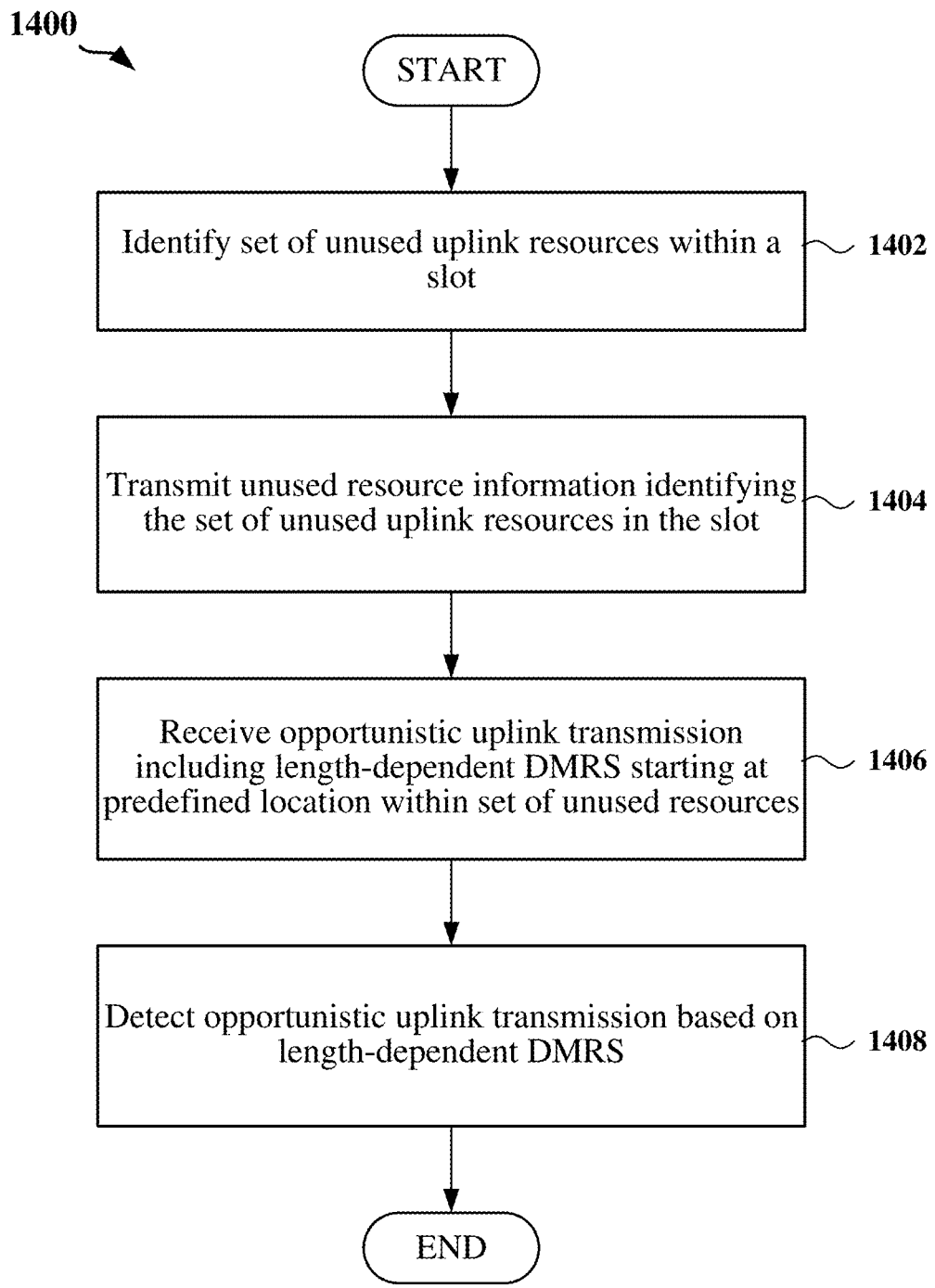
FIG. 14 is a flow chart of another method of enabling opportunistic uplink transmissions in a wireless communication network according to some aspects of the present disclosure.

FIG. 14 is a flow chart illustrating another exemplary process 1400 for enabling opportunistic uplink transmissions in a wireless communication network according to some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity illustrated in FIG. 8. In some examples, the process 1400 may be carried out by any suitable apparatus or means for carrying out the functions or algorithm described below.

At block 1402, the scheduling entity may identify a set of unused uplink resources within a slot (e.g., DL-centric or UL-centric). In some examples, the scheduling entity may schedule all regular uplink transmissions (e.g., dynamic, SPS, and/or random access) within a current slot and then identify any unused uplink resources (e.g., resource blocks within the PUSCH and/or PUCCH). For example, the opportunistic configuration circuitry 842 shown and described above in reference to FIG. 8 may identify the set of unused resources.

At block 1404, the scheduling entity may generate and transmit unused resource information identifying the set of unused uplink resources to the scheduled entities within the cell served by the scheduling entity. For example, the unused resource information may be broadcast within the common PDCCH or SIB in the DL burst of the current slot. In addition, the unused resource information may indicate the resource block granularity allowed for opportunistic uplink transmissions and pre-defined starting locations within the set of unused resources that opportunistic uplink transmissions may begin. For example, the opportunistic configuration circuitry 842 together with the DL traffic and control channel generation and transmission circuitry 843 and transceiver 810 shown and described above in reference to FIG. 8, may transmit the unused resource information.

At block 1406, the scheduling entity may receive an opportunistic uplink transmission from a scheduled entity starting at a predefined location within the set of unused resources. In some examples, the opportunistic uplink transmission may include grant-free user data traffic (e.g., grant-free PUSCH), a buffer status report, a power headroom report, a scheduling request, an extended scheduling request (e.g., multi-bit scheduling requests), and/or a random access request (e.g., PRACH). If more than one starting location/granularity is allowed, the opportunistic uplink transmission may further include a length-dependent demodulation reference signal (DMRS). For example, the UL traffic and control channel reception and processing circuitry 844 and transceiver 810 shown and described above in reference to FIG. 8, may receive the opportunistic uplink transmission.

At block 1408, the scheduling entity may detect the opportunistic uplink transmission based on the length-dependent DMRS. For example, the length-dependent DMRS may include a sequence length that is dependent upon the size of the opportunistic uplink transmission, which therefore enables the UL traffic and control channel reception and processing circuitry 844, shown and described above in reference to FIG. 8, to detect the number of resource blocks utilized for the opportunistic uplink transmission and perform corresponding channel estimation.

Figure 15:
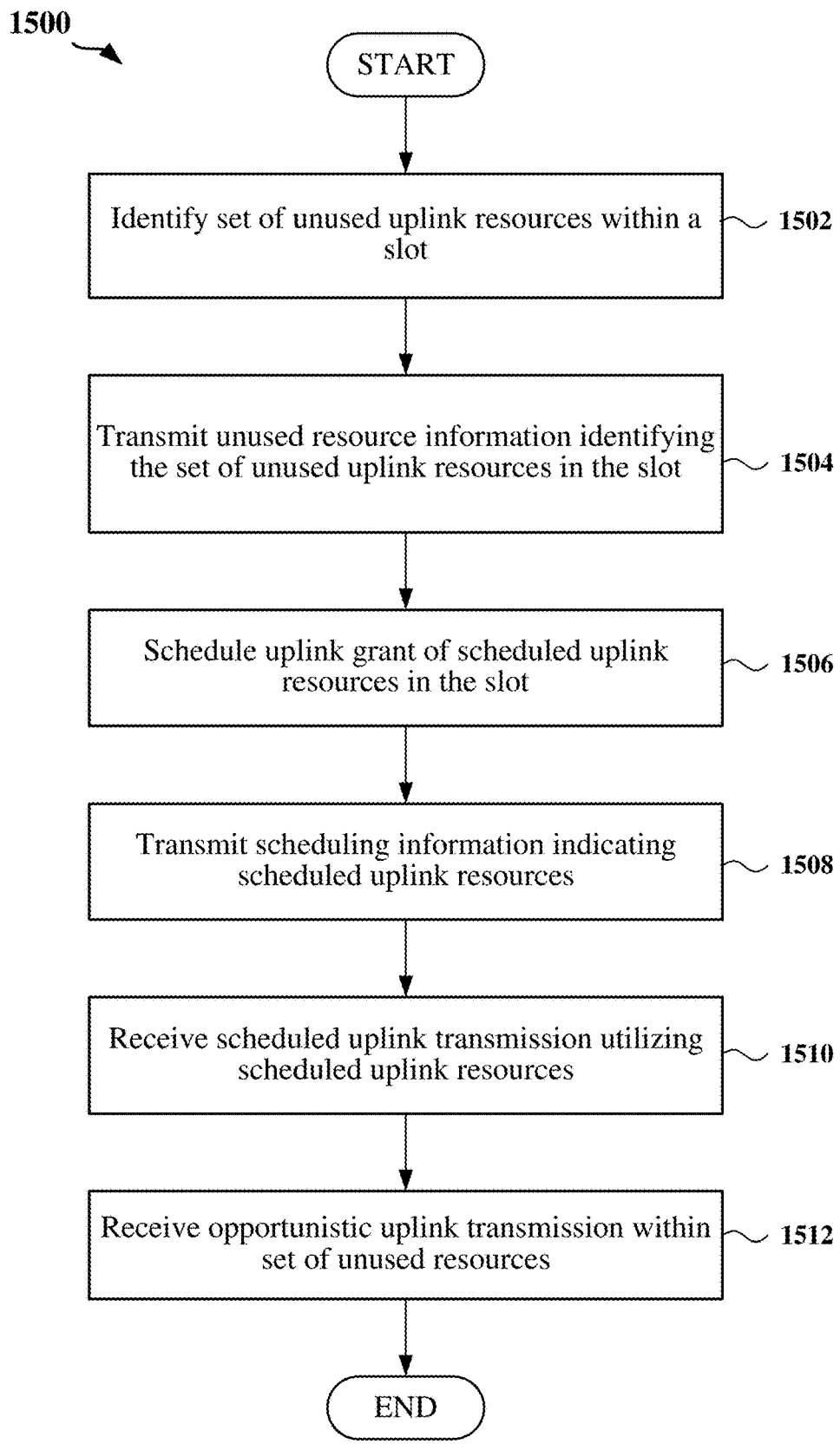
FIG. 15 is a flow chart of another method of enabling opportunistic uplink transmissions in a wireless communication network according to some aspects of the present disclosure.

FIG. 15 is a flow chart illustrating another exemplary process 1500 for enabling opportunistic uplink transmissions in a wireless communication network according to some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity illustrated in FIG. 8. In some examples, the process 1500 may be carried out by any suitable apparatus or means for carrying out the functions or algorithm described below.

At block 1502, the scheduling entity may identify a set of unused uplink resources within a slot (e.g., DL-centric or UL-centric). In some examples, the scheduling entity may schedule all regular uplink transmissions (e.g., dynamic, SPS, and/or random access) within a current slot and then identify any unused uplink resources (e.g., resource blocks within the PUSCH and/or PUCCH). For example, the opportunistic configuration circuitry 842, shown and described above in reference to FIG. 8, may identify the set of unused resources.

At block 1504, the scheduling entity may generate and transmit unused resource information identifying the set of unused uplink resources to the scheduled entities within the cell served by the scheduling entity. For example, the unused resource information may be broadcast within the common PDCCH or SIB in the DL burst of the current slot. For example, the opportunistic configuration circuitry 842 together with the DL traffic and control channel generation and transmission circuitry 843 and transceiver 810, shown and described above in reference to FIG. 8, may transmit the unused resource information.

At block 1506, the scheduling entity may schedule an uplink grant of scheduled uplink resources to a scheduled entity in the slot. For example, the resource assignment and scheduling circuitry 841, shown and described above in reference to FIG. 8, may schedule a semi-persistent scheduling (SPS) uplink grant, a dynamic uplink grant and/or a random access uplink grant. In some examples, the resource assignment and scheduling circuitry 841 may further configure the dynamic uplink grant (e.g., allocate the set of resource elements to the dynamic uplink grant) in response to receiving a scheduling request from the scheduled entity.

At block 1508, the scheduling entity may transmit scheduling information indicating the scheduled uplink resources to the scheduled entity. For example, the DL traffic and control channel generation and transmission circuitry 843 and transceiver 810, shown and described above in reference to FIG. 8, may generate and transmit a physical downlink control channel (PDCCH) (or Enhanced PDCCH (ePDCCH)) including downlink control information (DCI) indicating a grant of uplink resources for the scheduled entity.

At block 1510, the scheduling entity may receive the scheduled uplink transmission from the scheduled entity utilizing the scheduled uplink resources. For example, the UL traffic and control channel reception and processing circuitry 844 and transceiver 810, shown and described above in reference to FIG. 8, may receive user data traffic from a scheduled entity within the scheduled uplink resources. For dynamic or SPS uplink grants, the UL traffic and control channel reception and processing circuitry 844 may receive user data traffic from the scheduled entity in accordance with the set of resource elements allocated to the dynamic or SPS uplink grant.

At block 1512, the scheduling entity may further receive an opportunistic uplink transmission from the same scheduled entity within the set of unused resources. In some examples, the opportunistic uplink transmission may include grant-free user data traffic (e.g., grant-free PUSCH), a buffer status report, a power headroom report, a scheduling request, an extended scheduling request (e.g., multi-bit scheduling requests), and/or a random access request (e.g., PRACH). For example, the UL traffic and control channel reception and processing circuitry 844 and transceiver 810, shown and described above in reference to FIG. 8, may receive the opportunistic uplink transmission.

Figure 16:
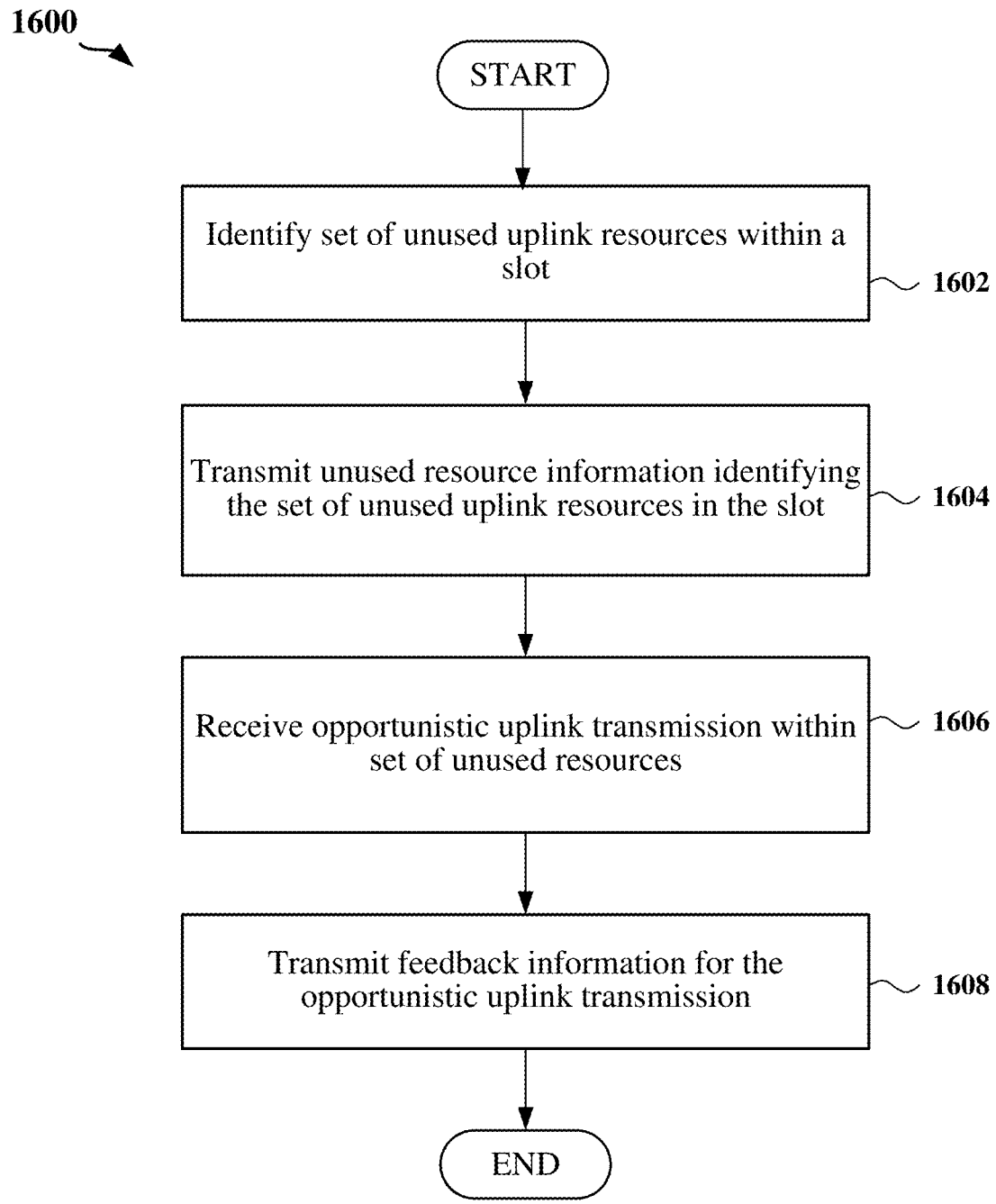
FIG. 16 is a flow chart of another method of enabling opportunistic uplink transmissions in a wireless communication network according to some aspects of the present disclosure.

FIG. 16 is a flow chart illustrating another exemplary process 1600 for enabling opportunistic uplink transmissions in a wireless communication network according to some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduling entity illustrated in FIG. 8. In some examples, the process 1600 may be carried out by any suitable apparatus or means for carrying out the functions or algorithm described below.

At block 1602, the scheduling entity may identify a set of unused uplink resources within a slot (e.g., DL-centric or UL-centric). In some examples, the scheduling entity may schedule all regular uplink transmissions (e.g., dynamic, SPS, and/or random access) within a current slot and then identify any unused uplink resources (e.g., resource blocks within the PUSCH and/or PUCCH). For example, the opportunistic configuration circuitry 842, shown and described above in reference to FIG. 8, may identify the set of unused resources.

At block 1604, the scheduling entity may generate and transmit unused resource information identifying the set of unused uplink resources to the scheduled entities within the cell served by the scheduling entity. For example, the unused resource information may be broadcast within the common PDCCH or SIB in the DL burst of the current slot. For example, the opportunistic configuration circuitry 842 together with the DL traffic and control channel generation and transmission circuitry 843 and transceiver 810, shown and described above in reference to FIG. 8, may transmit the unused resource information.

At block 1606, the scheduling entity may receive an opportunistic uplink transmission from a scheduled entity within the set of unused resources. In some examples, the opportunistic uplink transmission may include grant-free user data traffic (e.g., grant-free PUSCH), a buffer status report, a power headroom report, a scheduling request, an extended scheduling request (e.g., multi-bit scheduling requests), and/or a random access request (e.g., PRACH). For example, the UL traffic and control channel reception and processing circuitry 844 and transceiver 810, shown and described above in reference to FIG. 8, may receive the opportunistic uplink transmission.

At block 1608, the scheduling entity may transmit feedback information for the opportunistic transmission. For example, the DL traffic and control channel generation and transmission circuitry 843, shown and described above in reference to FIG. 8, may generate and transmit an ACK/NACK in response to received opportunistic uplink user data traffic, an uplink grant (e.g., in response to an opportunistic scheduling request) and/or a random access response (e.g., in response to an opportunistic random access request) to the scheduled entity. The ACK/NACK and/or uplink grant may be included in a PDCCH that is scrambled with the C-RNTI of the scheduled entity. The random access response may be scrambled with the TC-RNTI corresponding to the opportunistic random access request.

Figure 17:
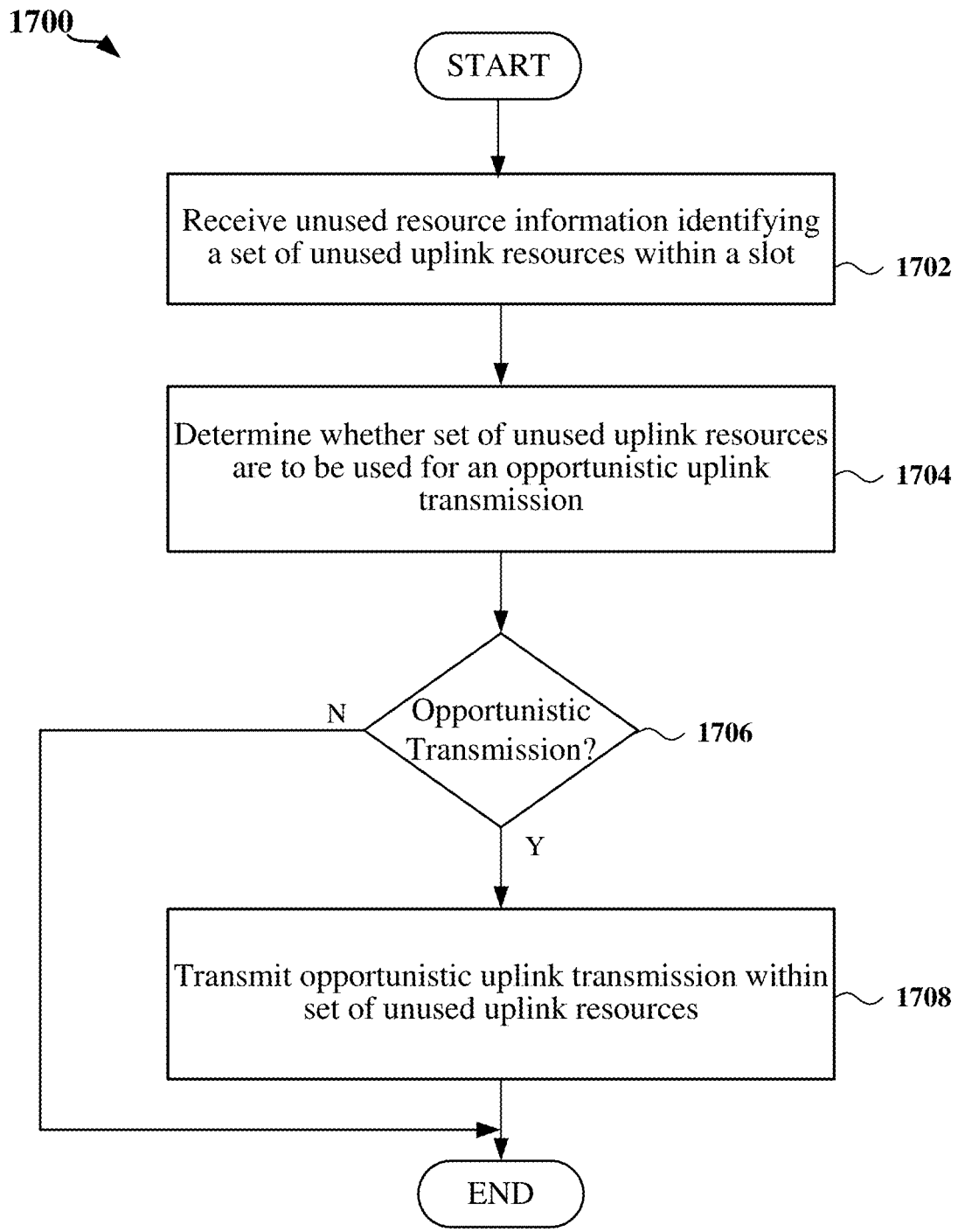
FIG. 17 is a flow chart of a method of performing opportunistic uplink transmissions in a wireless communication network according to some aspects of the present disclosure.

FIG. 17 is a flow chart illustrating an exemplary process 1700 for performing opportunistic uplink transmissions in a wireless communication network according to some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduled entity illustrated in FIG. 9. In some examples, the process 1700 may be carried out by any suitable apparatus or means for carrying out the functions or algorithm described below.

At block 1702, the scheduled entity may receive unused resource information identifying a set of unused uplink resources within a slot (e.g., a DL-centric slot or UL-centric slot). For example, the unused resource information may be broadcast within the common PDCCH or SIB in the DL burst of the current slot. For example, the DL traffic and control channel reception and processing circuitry 941, shown and described above in reference to FIG. 9, may receive the unused resource information.

At block 1704, the scheduled entity may determine whether the set of unused uplink resources should be used for an opportunistic uplink transmission. For example, the scheduled entity may consider whether the scheduled entity has user data traffic to transmit to the scheduling entity, the number of resource blocks available within the set of unused uplink resources, and/or whether the scheduled entity already has a regular uplink transmission grant when determining whether to utilize the set of unused uplink resources for an opportunistic uplink transmission. For example, the opportunistic mode circuitry 943, shown and described above in reference to FIG. 9, may determine whether to utilize the set of unused uplink resources for an opportunistic uplink transmission.

If the scheduled entity determines to utilize the set of unused uplink resources for an opportunistic uplink transmission (Y branch of block 1706), at block 1708, the scheduled entity may generate and transmit an opportunistic uplink transmission within the set of unused uplink resources. In some examples, the opportunistic uplink transmission may include one or more of a contention-free PUSCH (e.g., user data traffic) transmission, a scheduling request transmission or a random access request transmission. For example, the opportunistic mode circuitry 943 together with the UL traffic and control channel generation and transmission circuitry 942, shown and described above in reference to FIG. 9, may generate and transmit the opportunistic uplink transmission.

Figure 18:
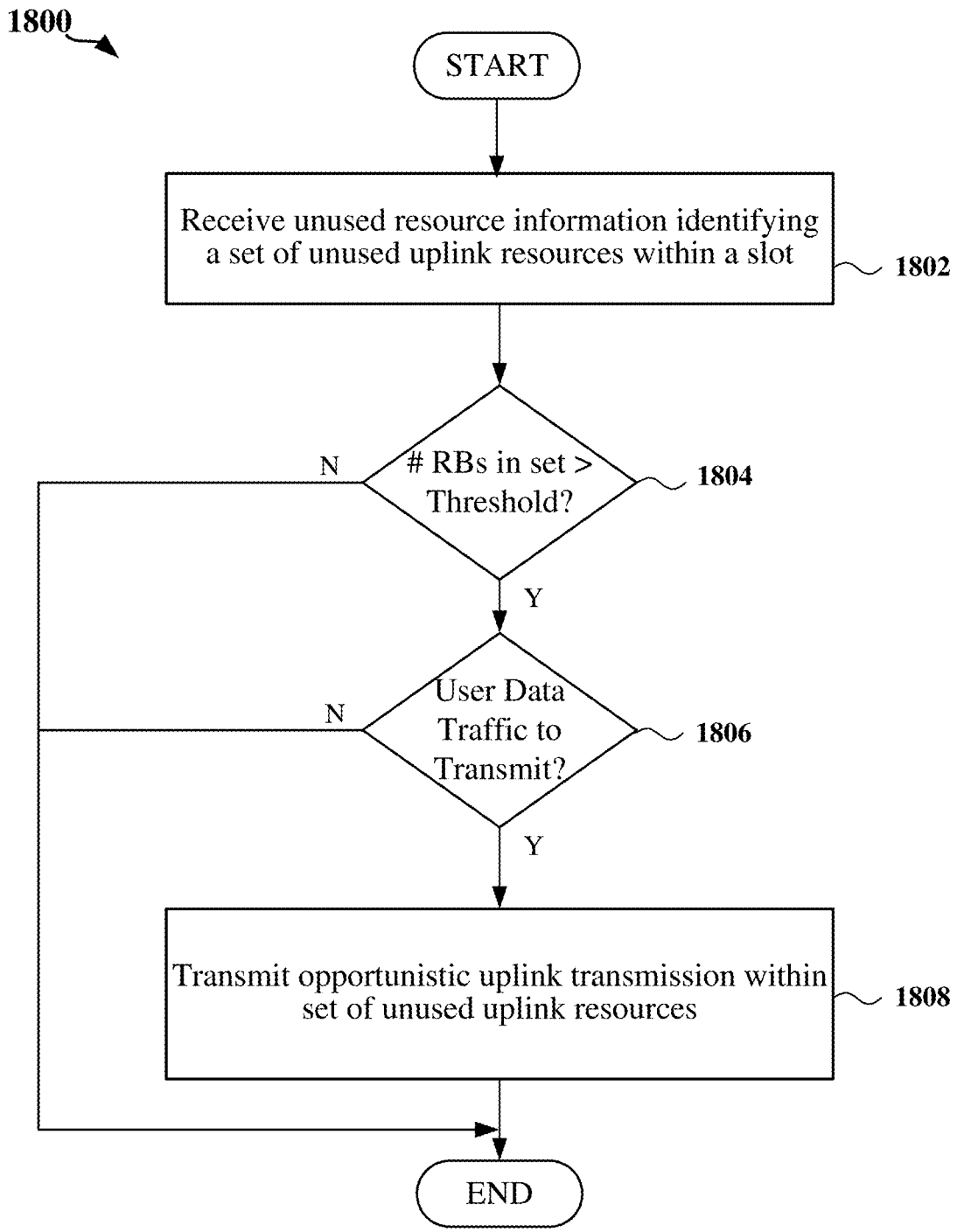
FIG. 18 is a flow chart of another method of performing opportunistic uplink transmissions in a wireless communication network according to some aspects of the present disclosure.

FIG. 18 is a flow chart illustrating another exemplary process 1800 for performing opportunistic uplink transmissions in a wireless communication network according to some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduled entity illustrated in FIG. 9. In some examples, the process 1800 may be carried out by any suitable apparatus or means for carrying out the functions or algorithm described below.

At block 1802, the scheduled entity may receive unused resource information identifying a set of unused uplink resources within a slot (e.g., a DL-centric slot or UL-centric slot). For example, the unused resource information may be broadcast within the common PDCCH or SIB in the DL burst of the current slot. For example, the DL traffic and control channel reception and processing circuitry 941, shown and described above in reference to FIG. 9, may receive the unused resource information.

At block 1804, the scheduled entity may determine whether the number of resource blocks available within the set of unused uplink resources is greater than a threshold.

For example, the opportunistic mode circuitry 943, shown and described above in reference to FIG. 9, may determine whether the number of resource blocks in the set of unused uplink resources is greater than the threshold.

If the number of resource blocks within the set of unused uplink resources is greater than the threshold (Y branch of block 1804), at block 1806, the scheduled entity may determine whether the scheduled entity has user data traffic to transmit to the scheduling entity. For example, the UL traffic and control channel generation and transmission circuitry 942 together with the opportunistic mode circuitry 943, shown and described above in reference to FIG. 9, may determine whether there is user data traffic to transmit.

If the scheduled entity determines that there is user data traffic to transmit (Y branch of block 1806), at block 1808, the scheduled entity may generate and transmit an opportunistic uplink transmission within the set of unused uplink resources. In some examples, the opportunistic uplink transmission may include one or more of a contention-free PUSCH (e.g., user data traffic) transmission, a scheduling request transmission or a random access request transmission. For example, the opportunistic mode circuitry 943 together with the UL traffic and control channel generation and transmission circuitry 942, shown and described above in reference to FIG. 9, may generate and transmit the opportunistic uplink transmission.

Figure 19:
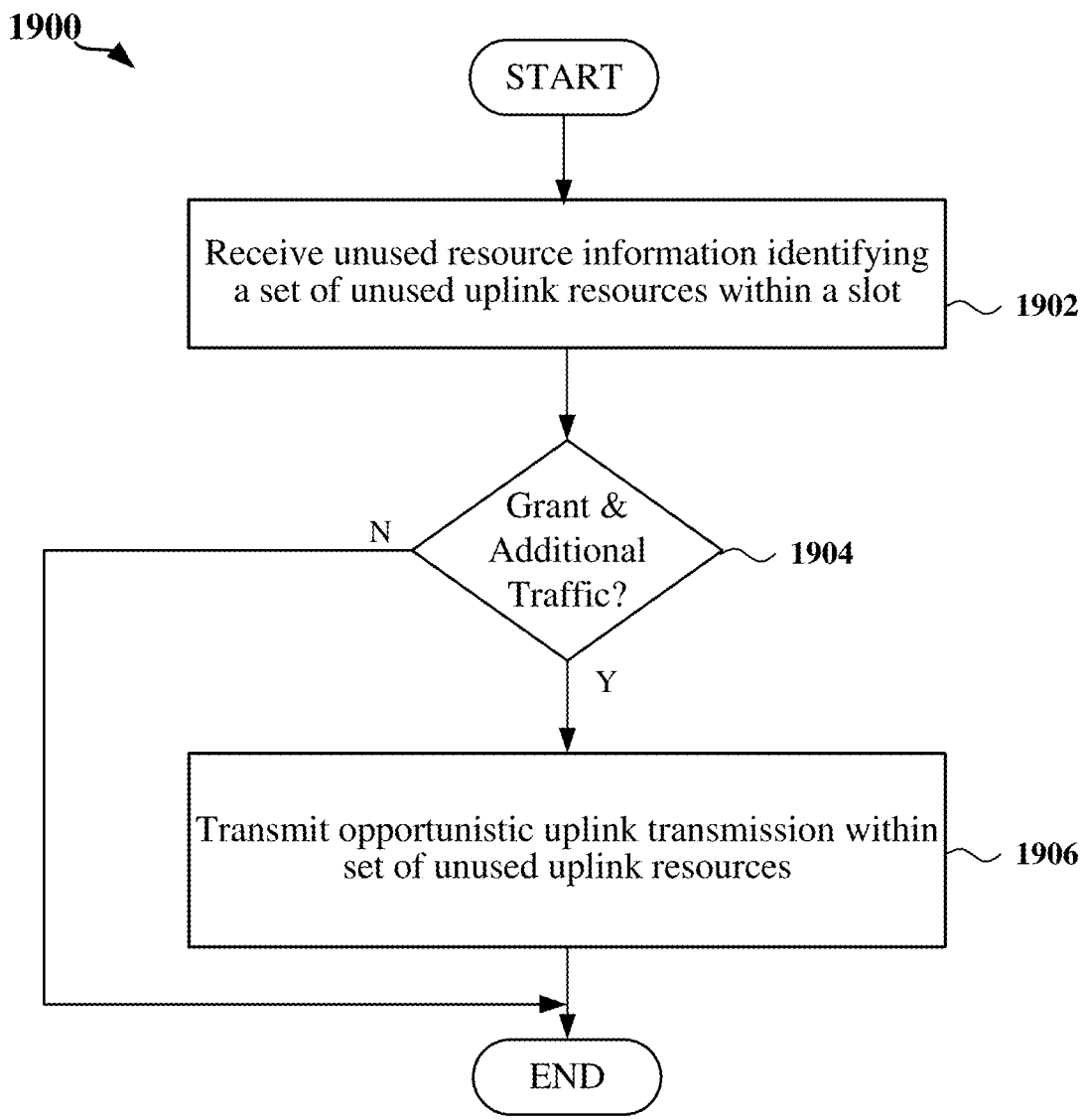
FIG. 19 is a flow chart of another method of performing opportunistic uplink transmissions in a wireless communication network according to some aspects of the present disclosure.

FIG. 19 is a flow chart illustrating another exemplary process 1900 for performing opportunistic uplink transmissions in a wireless communication network according to some aspects of the present disclosure. As described below, some or all illustrated features may be omitted in a particular implementation within the scope of the present disclosure, and some illustrated features may not be required for implementation of all embodiments. In some examples, the process 1900 may be carried out by the scheduled entity illustrated in FIG. 9. In some examples, the process 1900 may be carried out by any suitable apparatus or means for carrying out the functions or algorithm described below.

At block 1902, the scheduled entity may receive unused resource information identifying a set of unused uplink resources within a slot (e.g., a DL-centric slot or UL-centric slot). For example, the unused resource information may be broadcast within the common PDCCH or SIB in the DL burst of the current slot. For example, the DL traffic and control channel reception and processing circuitry 941, shown and described above in reference to FIG. 9, may receive the unused resource information.

At block 1904, the scheduled entity may determine whether the scheduled entity has already received a grant for a scheduled uplink transmission and also has additional urgent user data traffic to transmit. For example, the UL traffic and control channel generation and transmission circuitry 942 together with the opportunistic mode circuitry 943, shown and described above in reference to FIG. 9, may determine whether there is additional urgent user data traffic to transmit that is not associated with the uplink grant.

If the scheduled entity determines that there is additional urgent user data traffic to transmit that is not associated with the uplink grant (Y branch of block 1904), at block 1906, the scheduled entity may generate and transmit an opportunistic uplink transmission within the set of unused uplink resources. In some examples, the opportunistic uplink transmission may include a contention-free PUSCH (e.g., user data traffic) transmission. For example, the opportunistic mode circuitry 943 together with the UL traffic and control channel generation and transmission circuitry 942, shown and described above in reference to FIG. 9, may generate and transmit the opportunistic uplink transmission.

Figure 20:
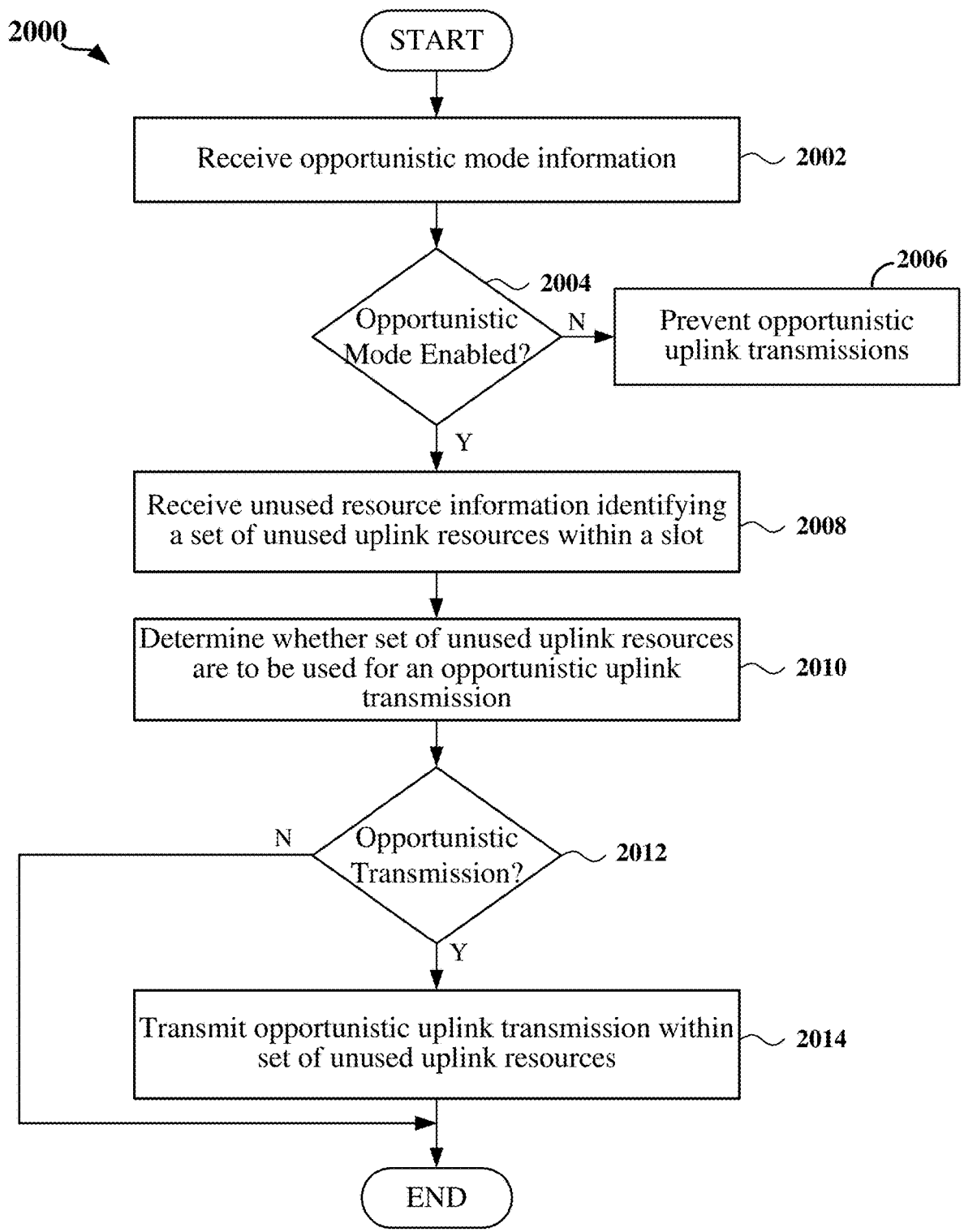
FIG. 20 is a flow chart of another method of performing opportunistic uplink transmissions in a wireless communication network according to some aspects of the present disclosure.

FIG. 20 is a flow chart illustrating another exemplary process 2000 for performing opportunistic uplink transmissions in a wireless communication network according to some aspects of the present disclosure. As described below, some or all illustrated features may be omitted in a particular implementation within the scope of the present disclosure, and some illustrated features may not be required for implementation of all embodiments. In some examples, the process 2000 may be carried out by the scheduled entity illustrated in FIG. 9. In some examples, the process 2000 may be carried out by any suitable apparatus or means for carrying out the functions or algorithm described below.

At block 2002, the scheduled entity may receive opportunistic mode information from a scheduling entity. For example, the opportunistic mode information may include a single bit that turns on/off the opportunistic mode on the scheduled entity. The opportunistic mode information may be received, for example, via RRC signaling or within a physical downlink control channel (PDCCH). For example, the DL traffic and control channel reception and processing circuitry 941, shown and described above in reference to FIG. 9, may receive the opportunistic mode information.

At block 2004, the scheduled entity may determine whether the opportunistic mode is enabled based on the opportunistic mode information. For example, the opportunistic mode circuitry 943, shown and described above in reference to FIG. 9, may determine whether the opportunistic mode is enabled.

If the opportunistic mode is disabled (N branch of block 2004), at block 2006, the scheduled entity may be prevented from generating and transmitting opportunistic uplink transmissions. When the opportunistic mode is disabled on the scheduled entity, the scheduled entity is prevented from transmitting opportunistic uplink transmissions, but may operate in a regular mode if the scheduled entity is configured to operate in a regular mode. For example, the opportunistic mode circuitry 943, shown and described above in reference to FIG. 9, may prevent the scheduled entity from generating and transmitting opportunistic uplink transmissions when the opportunistic mode is disabled.

If the opportunistic mode is enabled (Y branch of block 2004), at block 2008, the scheduled entity may receive unused resource information identifying a set of unused uplink resources within a slot (e.g., a DL-centric slot or UL-centric slot). For example, the unused resource information may be broadcast within the common PDCCH or SIB in the DL burst of the current slot. For example, the DL traffic and control channel reception and processing circuitry 941, shown and described above in reference to FIG. 9, may receive the unused resource information.

At block 2010, the scheduled entity may determine whether the set of unused uplink resources should be used for an opportunistic uplink transmission. For example, the scheduled entity may consider whether the scheduled entity has user data traffic to transmit to the scheduling entity, the number of resource blocks available within the set of unused uplink resources, and/or whether the scheduled entity already has a regular uplink transmission grant when determining whether to utilize the set of unused uplink resources for an opportunistic uplink transmission. For example, the opportunistic mode circuitry 943, shown and described above in reference to FIG. 9, may determine whether to utilize the set of unused uplink resources for an opportunistic uplink transmission.

If the scheduled entity determines to utilize the set of unused uplink resources for an opportunistic uplink transmission (Y branch of block 2012), at block 2014, the scheduled entity may generate and transmit an opportunistic uplink transmission within the set of unused uplink resources. In some examples, the opportunistic uplink transmission may include one or more of a contention-free PUSCH (e.g., user data traffic) transmission, a scheduling request transmission or a random access request transmission. For example, the opportunistic mode circuitry 943 together with the UL traffic and control channel generation and transmission circuitry 942, shown and described above in reference to FIG. 9, may generate and transmit the opportunistic uplink transmission.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2 and/or 6-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication in a wireless communication network for a scheduling entity to communicate with a set of one or more scheduled entities, the method comprising:
   identifying a set of unused uplink resources unassigned to any of the set of one or more scheduled entities within a slot;
   transmitting unused resource information identifying the set of unused uplink resources to the set of one or more scheduled entities;
   receiving an opportunistic uplink transmission from a scheduled entity of the set of one or more scheduled entities at a starting location of a plurality of predefined starting locations within the set of unused uplink resources of the slot; and
   detecting the opportunistic uplink transmission based on the starting location.

2. The method of claim 1, wherein the opportunistic uplink transmission comprises one of a grant-free user data traffic transmission, buffer status report, or a power headroom report.

3. The method of claim 1, wherein the opportunistic uplink transmission comprises one of a grant-free user data traffic transmission, a scheduling request, or a random access request.

4. The method of claim 1, wherein the opportunistic uplink transmission comprises an extended cyclic prefix when the scheduled entity lacks a timing advance.

5. The method of claim 1, wherein the opportunistic uplink transmission comprises a length-dependent demodulation reference signal and wherein detecting the opportunistic uplink transmission further comprises:
identifying a number of resource blocks of the opportunistic uplink transmission based on the length-dependent demodulation reference signal.

6. The method of claim 1, wherein transmitting the unused resource information to the set of one or more scheduled entities further comprises:
broadcasting the unused resource information within a common space of a physical downlink control channel, within a system information block, or within a master information block of a physical broadcast channel.

7. The method of claim 1, wherein the unused resource information comprises first unused resource information identifying physical uplink shared channel resources within the set of unused uplink resources, scheduling request resources within the set of unused uplink resources, and random access channel resources within the set of unused uplink resources.

8. The method of claim 1, wherein the set of unused uplink resources comprises one or more resource blocks or resource block groups.

9. The method of claim 1, further comprising:
scheduling an uplink grant of scheduled uplink resources for the scheduled entity within the slot;
transmitting scheduling information indicating the scheduled uplink resources to the scheduled entity; and
receiving a scheduled uplink transmission from the scheduled entity utilizing the scheduled uplink resources.

10. The method of claim 1, further comprising:
transmitting feedback information for the opportunistic uplink transmission within a physical downlink control channel of a subsequent slot.

11. The method of claim 2, wherein the opportunistic uplink transmission comprises the grant-free user data traffic transmission and wherein:
the opportunistic uplink transmission further comprises opportunistic transmission information comprising at least a modulation and coding scheme (MCS) and resource block information for the opportunistic uplink transmission; and
the opportunistic transmission information is encoded with a fixed MCS and resource block configuration.

12. The method of claim 2, wherein
the opportunistic uplink transmission comprises a demodulation reference signal (DMRS); and
the DRMS is code-division multiplexed with one or more other opportunistic uplink transmissions.

13. The method of claim 3, wherein the opportunistic uplink transmission comprises the scheduling request and wherein the scheduling request is code-division multiplexed with one or more other opportunistic uplink transmissions.

14. The method of claim 3, wherein the opportunistic uplink transmission comprises only the random access request when the scheduled entity lacks a timing advance.

15. The method of claim 8, wherein the unused resource information comprises a bit map of resource blocks or resource block groups that indicates whether each of the resource blocks or the resource block groups is in use.

16. The method of claim 8, wherein the unused resource information comprises a set of resource block indices or resource block group indices and an indicator bit that indicates whether the resource blocks associated with the set of resource block indices or the resource block groups associated with the set of resource block indices are in use or not in use.

17. The method of claim 10, wherein the feedback information is scrambled with one of a cell radio network temporary identifier (C-RNTI) of the scheduled entity or a temporary C-RNTI corresponding to the opportunistic uplink transmission.

18. A scheduling entity in a wireless communication network, comprising:
a processor;
a transceiver communicatively coupled to the processor; and
a memory communicatively coupled to the processor, wherein the processor is configured to:
identify a set of unused uplink resources unassigned to any of a set of one or more scheduled entities within a slot;
transmit unused resource information identifying the set of unused uplink resources to the set of one or more scheduled entities via the transceiver;
receive an opportunistic uplink transmission via the from a scheduled entity of the set of one or more scheduled entities at a starting location of a plurality of predefined starting locations within the set of unused uplink resources of the slot when the scheduled entity is operating in an opportunistic mode; and
detect the opportunistic uplink transmission based on the starting location.

19. The scheduling entity of claim 18, wherein the processor is further configured to:
broadcast the unused resource information within a common space of a physical downlink control channel, within a system information block, or within a master information block of a physical broadcast channel.

20. A method of wireless communication in a wireless communication network for a scheduled entity to communicate with a scheduling entity, the method comprising:
receiving unused resource information identifying a set of unused uplink resources within a slot; and
when the scheduled entity is operating in an opportunistic mode:
determining whether the set of unused uplink resources are to be utilized for an opportunistic uplink transmission; and
if the set of unused uplink resources are to be utilized for the opportunistic uplink transmission, transmitting the opportunistic uplink transmission at a starting location of a plurality of predefined starting locations within the set of unused uplink resources of the slot.

21. The method of claim 20, wherein determining whether the set of unused uplink resources are to be utilized for the opportunistic uplink transmission further comprises:
if a number of resource blocks within the set of unused uplink resources is greater than a threshold and the scheduled entity comprises user data traffic to be transmitted to the scheduling entity, utilizing the set of unused uplink resources for the opportunistic uplink transmission.

22. The method of claim 20, wherein determining whether the set of unused uplink resources are to be utilized for the opportunistic uplink transmission further comprises:
if the scheduled entity comprises a dynamic uplink grant for dynamic user data traffic in the slot and the scheduled entity comprises additional urgent user data traffic to be transmitted to the scheduling entity, utilizing the set of unused uplink resources for the opportunistic uplink transmission.

23. A scheduled entity in a wireless communication network, comprising:
    a processor;
    a transceiver communicatively coupled to the processor; and
    a memory communicatively coupled to the processor, wherein the processor is configured to:
    receive unused resource information identifying a set of unused uplink resources within a slot via the transceiver; and
    when the scheduled entity is operating in an opportunistic mode:
    determine whether the set of unused uplink resources are to be utilized for an opportunistic uplink transmission; and
    if the set of unused uplink resources are to be utilized for the opportunistic uplink transmission, transmit the opportunistic uplink transmission at a starting location of a plurality of predefined starting locations within the set of unused uplink resources of the slot via the transceiver.

24. The scheduled entity of claim 23, wherein the processor is further configured to:
    if a number of resource blocks within the set of unused uplink resources is greater than a threshold and the scheduled entity comprises user data traffic to be transmitted to the scheduling entity, utilize the set of unused uplink resources for the opportunistic uplink transmission.

25. The scheduled entity of claim 23, wherein the processor is further configured to:
    if the scheduled entity comprises a dynamic uplink grant for dynamic user data traffic in the slot and the scheduled entity comprises additional urgent user data traffic to be transmitted to the scheduling entity, utilize the set of unused uplink resources for the opportunistic uplink transmission.

* * * * *